(12) United States Patent
Sato et al.

(10) Patent No.: US 11,835,744 B2
(45) Date of Patent: Dec. 5, 2023

(54) SENSOR

(71) Applicant: FUJIFILM Corporation, Tokyo (JP)

(72) Inventors: Hiroshi Sato, Minamiashigara (JP);
Katsumi Sasata, Minamiashigara (JP);
Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 8 days.

(21) Appl. No.: 17/522,266

(22) Filed: Nov. 9, 2021

(65) Prior Publication Data
US 2022/0066080 A1    Mar. 3, 2022

Related U.S. Application Data

(63) Continuation of application No. PCT/JP2020/017296, filed on Apr. 22, 2020.

(30) Foreign Application Priority Data

May 10, 2019    (JP) .................. 2019-090017

(51) Int. Cl.
*G02B 5/30*    (2006.01)
*G02F 1/1335*    (2006.01)
(Continued)

(52) U.S. Cl.
CPC ............ *G02B 5/3016* (2013.01); *G01S 7/481* (2013.01); *G02B 5/283* (2013.01); *G02B 5/305* (2013.01);
(Continued)

(58) Field of Classification Search
CPC ...... G02B 5/3016; G02B 5/283; G02B 5/305; G02F 1/133543; G02F 2201/343; G01S 7/481
See application file for complete search history.

(56) References Cited

U.S. PATENT DOCUMENTS 5,627,666 A * 5/1997 Sharp ..................... G02F 1/141
349/98
2010/0118123 A1    5/2010 Freedman et al.
(Continued)

FOREIGN PATENT DOCUMENTS

JP          2016-519327 A    6/2016
WO    WO 2014/196638 A1    12/2014

OTHER PUBLICATIONS

Stockley, J.E. et al. "Fabry-Perot etalon with polymer cholesteric liquid-crystal mirrors." Optics Letters. vol. 24, No. 1, Jan. 1, 1999, pp. 55-57 (Year: 1999).*

(Continued)

*Primary Examiner* — Nathanael R Briggs
(74) *Attorney, Agent, or Firm* — Birch, Stewart, Kolasch & Birch, LLP

(57) ABSTRACT

Provided is a sensor having a high SN ratio. The sensor includes a light source, a band pass filter, and a light-receiving element, in which the band pass filter includes two cholesteric liquid crystal layers and a discontinuous layer disposed between the two cholesteric liquid crystal layers, in the two cholesteric liquid crystal layers, helical twisted directions and helical pitches are the same, and in a case where the discontinuous layer is a layer other than a cholesteric liquid crystal layer and a wavelength having a lowest reflectivity in a selective reflection wavelength range of the band pass filter is represented by λm [nm], a thickness [nm] is in a range of "30×(λm/550) to 150×(λm/550)".

8 Claims, 11 Drawing Sheets

(51) Int. Cl.
   *G01S 7/481*   (2006.01)
   *G02B 5/02*    (2006.01)
   *G02B 5/28*    (2006.01)
(52) U.S. Cl.
   CPC .. *G02F 1/133543* (2021.01); *G02F 2201/343* (2013.01)

(56) References Cited

U.S. PATENT DOCUMENTS

| 2016/0011353 A1* | 1/2016 | Escuti | G03B 21/2073 |
| | | | 359/15 |
| 2016/0085102 A1* | 3/2016 | Ohmuro | G02B 5/305 |
| | | | 362/19 |

OTHER PUBLICATIONS

Japanese Office Action for Japanese Application No. 2021-519333, dated Jul. 12, 2022, with English translation.
International Preliminary Report on Patentability and Written Opinion of the International Searching Authority for International Application No. PCT/JP2020/017296, dated Nov. 25, 2021, with an English translation.
International Search Report for International Application No. PCT/JP2020/017296, dated Jul. 7, 2020, with an English translation.
Stockley et al., "Fabry-Perot etalon with polymer cholesteric liquid-crystal mirrors," Optics Letters, vol. 24, No. 1, 1999, pp. 55-57, 3 pages total.

* cited by examiner

SENSOR

CROSS-REFERENCE TO RELATED APPLICATIONS

This application is a Continuation of PCT International Application No. PCT/JP2020/017296 filed on Apr. 22, 2020, which claims priority under 35 U.S.C. § 119(a) to Japanese Patent Application No. 2019-090017 filed on May 10, 2019. The above application is hereby expressly incorporated by reference, in its entirety, into the present application.

BACKGROUND OF THE INVENTION

1. Field of the Invention

The present invention relates to a sensor that is used for a distance measurement device or the like.

2. Description of the Related Art

A distance-measuring sensor (depth sensor) for measuring the distance to an object is used for motion capture, automated driving of a vehicle, automatic driving of a robot, and the like.

For example, US2010/0118123A describes a time-of-flight type distance-measuring sensor (optical distance sensor), in which the distance to a measurement target object is calculated based on a phase difference between blinking infrared light and light reflected from the measurement target object.

Specifically, US2010/0118123A describes that infrared light is emitted to the measurement target object as blinking light corresponding to a light-emitting signal, infrared light reflected from the measurement target object is received to generate a light-receiving signal, a time difference between waveforms (for example, pulse waveforms) of the light-emitting signal and the light-receiving signal, that is, a phase difference is obtained, and the distance between the optical distance sensor and the measurement target object is obtained based on this phase difference.

SUMMARY OF THE INVENTION

In addition to the distance-measuring sensor, a sensor that performs optical measurement performs various types of measurement, for example, by emitting measurement light from a light source, measuring the measurement light reflected from an object with a light-receiving element, and analyzing the measurement result.

Here, in a space where the sensor performs the measurement, various light components such as sunlight or a lighting are present, and these light components are incident into the light-receiving element as so-called external light.

Here, the external light may include light in a wavelength range emitted from a light source and light for which the light-receiving element has sensitivity. In a case where the external light is incident into the light-receiving element of the sensor, the external light becomes noise such that the signal-noise ratio (SN ratio) of the sensor decreases and the measurement accuracy of the sensor decreases.

An object of the present invention is to solve the above-described problem of the related art and to provide: a sensor such as a distance-measuring sensor in which external light becoming noise is prevented from being incident into a light-receiving element such that high-accuracy measurement can be performed at a high SN ratio.

In order to achieve the object, the present invention has the following configurations.

[1] A sensor comprising:
a light source;
a band pass filter; and
a light-receiving element,
in which the band pass filter includes a first cholesteric liquid crystal layer and a second cholesteric liquid crystal layer that are layers obtained by immobilizing a cholesteric liquid crystalline phase and a discontinuous layer that is disposed between the first cholesteric liquid crystal layer and the second cholesteric liquid crystal layer,
in the first cholesteric liquid crystal layer and the second cholesteric liquid crystal layer, helical twisted directions and helical pitches of the cholesteric liquid crystalline phases are the same, and
in a case where the discontinuous layer is a layer other than a cholesteric liquid crystal layer and a wavelength having a lowest reflectivity in a selective reflection wavelength range of the band pass filter is represented by $\lambda m$ [nm], a thickness [nm] is in a range of $$30 \times (\lambda m/550) \text{ to } 150 \times (\lambda m/550).$$

[2] The sensor according to [1],
in which the discontinuous layer is an optically-isotropic layer.
[3] The sensor according to [1],
in which the discontinuous layer is an optically-anisotropic layer.
[4] The sensor according to [3],
in which the optically-anisotropic layer is a liquid crystal layer.
[5] A sensor comprising:
a light source;
a band pass filter; and
a light-receiving element,
in which the band pass filter includes a first cholesteric liquid crystal layer and a second cholesteric liquid crystal layer that are layers obtained by immobilizing a cholesteric liquid crystalline phase,
in the first cholesteric liquid crystal layer and the second cholesteric liquid crystal layer, helical twisted directions and helical pitches of the cholesteric liquid crystalline phases are the same,
the first cholesteric liquid crystal layer and the second cholesteric liquid crystal layer are in direct contact with each other, and
an angle between optical axes derived from a liquid crystal compound on contact surfaces of the first cholesteric liquid crystal layer and the second cholesteric liquid crystal layer is 45° to 90°.
[6] The sensor according to any one of [1] to [5], further comprising:
a lens element that is provided between the light source and the band pass filter.
[7] The sensor according to [6],
in which the lens element is a diffraction element.
[8] The sensor according to [7],
in which the diffraction element is a liquid crystal diffraction element including an optically-anisotropic layer that is formed of a liquid crystal composition including a liquid crystal compound,
the optically-anisotropic layer has a liquid crystal alignment pattern in which a direction of an optical axis derived from the liquid crystal compound changes while continuously rotating in at least one in-plane direction, and in a case where a length over which the direction of the optical axis derived from the liquid crystal compound rotates by 180° in a plane is set as a single period, the length of the single period in the liquid crystal alignment pattern gradually decreases in the one in-plane direction.

[9] The sensor according to [8], in which the liquid crystal alignment pattern of the optically-anisotropic layer in the liquid crystal diffraction element is a concentric circular pattern having a concentric circular shape where the one in-plane direction in which the direction of the optical axis derived from the liquid crystal compound changes while continuously rotating moves from an inside toward an outside.

[10] The sensor according to any one of [1] to [9], further comprising:

a light shielding member that shields light in a wavelength range that overlaps at least a part of a selective reflection wavelength range of the band pass filter, the wavelength range being at least one of a longer wavelength range or a shorter wavelength range than a wavelength having a lowest reflectivity in the selective reflection wavelength range of the band pass filter.

[11] The sensor according to [10], in which the light shielding member shields both of the longer wavelength range and the shorter wavelength range than the wavelength having the lowest reflectivity in the selective reflection wavelength range of the band pass filter.

[12] The sensor according to any one of [1] to [11], in which a first band pass filter and a second band pass filter are provided as the band pass filter, and in the first cholesteric liquid crystal layer and the second cholesteric liquid crystal layer of the first band pass filter and the first cholesteric liquid crystal layer and the second cholesteric liquid crystal layer of the second band pass filter, helical twisted directions are different from each other and helical pitches are the same.

In the sensor according to the present invention, external light becoming noise is prevented from being incident into a light-receiving element such that high-accuracy measurement can be performed at a high SN ratio.

DESCRIPTION OF THE PREFERRED EMBODIMENTS

Hereinafter, a sensor according to an embodiment of the present invention will be described in detail based on preferable embodiments shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same", "match", and "equal" includes a case where an error range is generally allowable in the technical field. In addition, in the present specification, the meaning of "all", "entire", or "entire surface" includes not only 100% but also a case where an error range is generally allowable in the technical field, for example, 99% or more, 95% or more, or 90% or more.

In the present specification, a selective reflection center wavelength refers to an average value of two wavelengths at which, in a case where a minimum value of a transmittance of a target object (member) is represented by Tmin (%), a half value transmittance: T½ (%) represented by the following expression is exhibited.

Expression for obtaining Half Value Transmittance:
$T½=100-(100-T\min)\div2$

Figure 1:
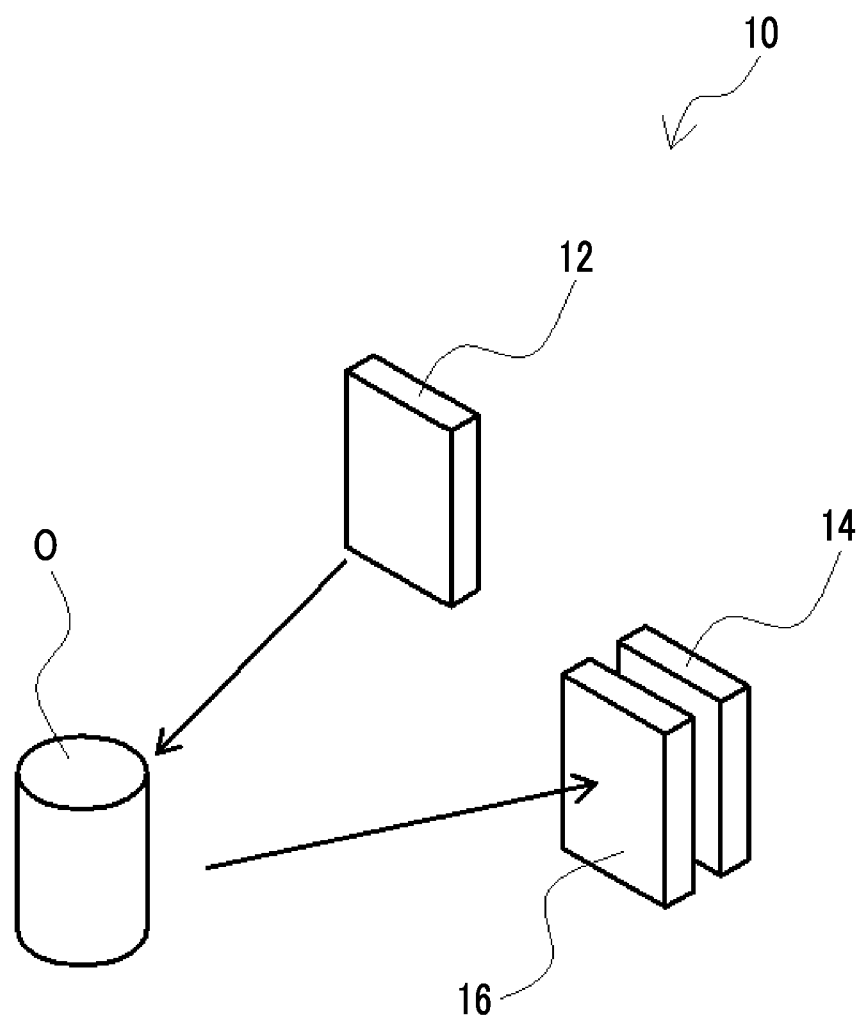
FIG. 1 is a diagram conceptually showing an example of a sensor according to the present invention.

FIG. 1 is a diagram conceptually showing an example of the sensor according to the present invention.

A sensor 10 shown in FIG. 1 includes a light source 12, a light-receiving element 14, and a band pass filter 16.

The sensor 10 performs photometry on measurement light that is emitted from the light source 12 and reflected from the object O using the light-receiving element 14 through the band pass filter 16 and analyzes the photometry result to measure the object O. Here, the band pass filter 16 uses the cholesteric liquid crystal layer, and allows transmission of only light in a wide wavelength range of the selective reflection wavelength range of the cholesteric liquid crystal layer. Therefore, the sensor 10 according to the embodiment of the present invention can reduce of the influence of external light such that high-accuracy measurement can be performed at a high SN ratio.

The measurement of the object O by the sensor 10 according to the embodiment of the present invention can be applied to various well-known measurements that are performed by an optical sensor. Accordingly, the object O is not particularly limited and may be a person, an animal, or a thing.

Examples of the measurement of the object O include measurement of the distance to the object O (distance measurement), measurement of the shape of the object O, measurement of the movement of the object O, and identification of the object O.

All of these measurements may be performed using a well-known method. For example, the sensor 10 measures the distance to the object O using a time of flight (TOF) method.

The light source 12 is not particularly limited and all of the various well-known light sources that are used as a light source in an optical sensor can be used.

Examples of the light source include an electric lamp such as a mercury lamp, a fluorescent lamp, a halogen lamp, a light emitting diode (LED), and a laser such as a semiconductor laser.

The light emitted from the light source 12 may be either diffused light or parallel light such as a collimated light beam. In addition, in the sensor 10, optionally, light emitted from the light source 12 may be scanned one-dimensionally or two-dimensionally.

The wavelength of light emitted from the light source 12 is not particularly limited and may be visible light or invisible light such as infrared light or ultraviolet light. In particular, the infrared light as the invisible light is suitably used as the light emitted from the light source 12.

Further, the light emitted from the light source 12 may be unpolarized light or polarized light. In a case where polarized light is emitted from the light source 12, the emitted light may be linearly polarized light or circularly polarized light.

The light-receiving element 14 is not particularly limited and all of the various well-known light-receiving elements (photodetectors (elements)) that are used as a light-receiving element in an optical sensor can be used.

Examples of the light-receiving element 14 include a complementary metal oxide semiconductor (CMOS) sensor and a charge-coupled device (CCD) sensor.

The light-receiving element 14 does not need to have spatial resolution. A line sensor that detects light in a line shape or an area sensor that two-dimensionally detects light is preferable, and an area sensor is more preferable.

In the sensor 10 according to the embodiment of the present invention, the light-receiving element 14 measures the measurement light reflected from the object O through the band pass filter 16.

Although described below, in the present invention, the band pass filter 16 has a selective reflection wavelength range used in the cholesteric liquid crystal layer, and this selective reflection wavelength range includes a wavelength range where light transmits. In the sensor 10 according to the embodiment of the present invention, as the light-receiving element 14, an element having sensitivity in the transmission wavelength range of the selective reflection wavelength range of the band pass filter 16 is used. It is preferable that the wavelength range where the light-receiving element 14 has sensitivity is in the selective reflection wavelength range of the band pass filter 16.

In addition, in the band pass filter 16, a wavelength range of emitted light from the light source 12 includes the above-described transmission wavelength range of the selective reflection wavelength range. In other words, in the sensor 10 according to the embodiment of the present invention, as the light source 12, a light source that emits light having the transmission wavelength range of the selective reflection wavelength range of the band pass filter 16 is used.

The light-receiving element 14 measures the measurement light that is emitted from the light source 12 through band pass filter 16 and reflected from the object O.

Figure 2:
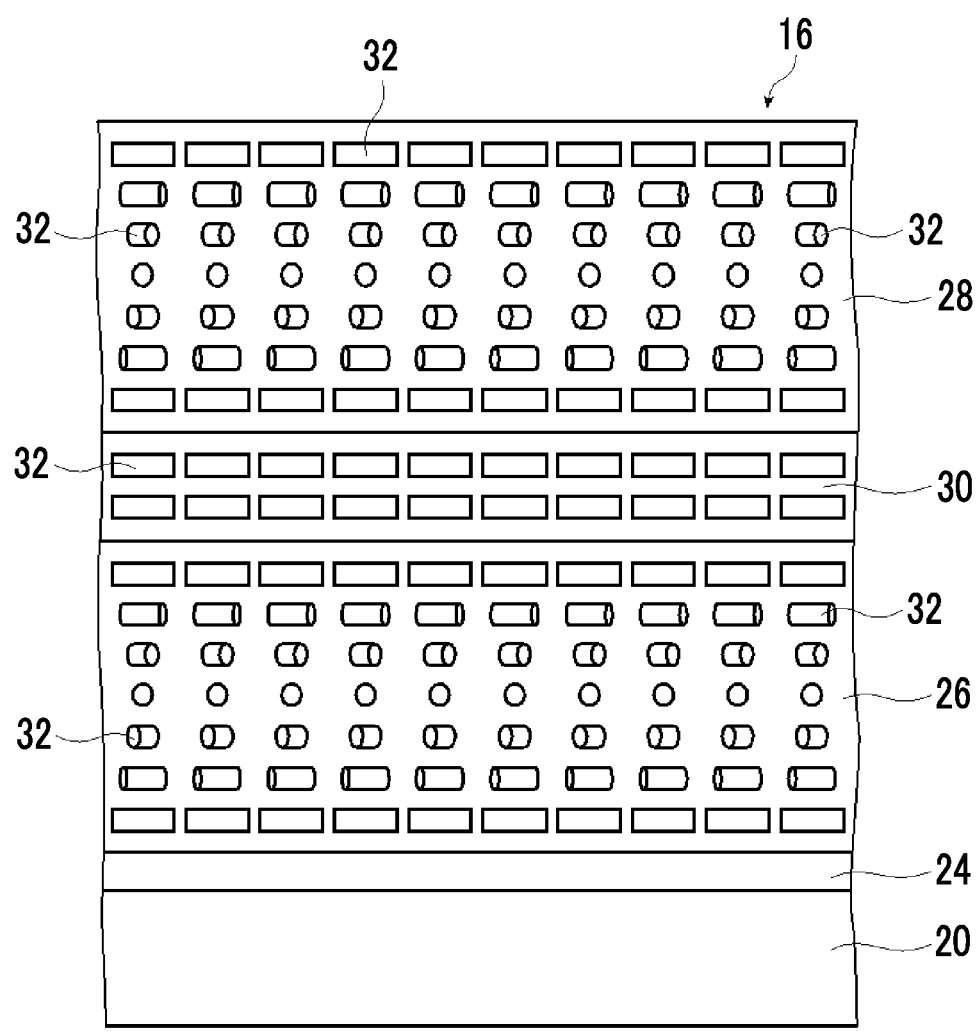
FIG. 2 is a diagram conceptually showing a band pass filter of the sensor shown in FIG. 1.

FIG. 2 conceptually shows an example of the band pass filter 16.

As shown in FIG. 2, the band pass filter 16 includes a support 20, an alignment film 24, a first cholesteric liquid crystal layer 26, a second cholesteric liquid crystal layer 28, and a discontinuous layer 30. In the band pass filter 16, the discontinuous layer 30 is interposed between the first cholesteric liquid crystal layer 26 and the second cholesteric liquid crystal layer 28.

Both of the first cholesteric liquid crystal layer 26 and the second cholesteric liquid crystal layer 28 are obtained by immobilizing a cholesteric liquid crystalline phase, reflect circularly polarized light in a specific wavelength range in a specific turning direction, and allow transmission of the other light. In the first cholesteric liquid crystal layer 26 and the second cholesteric liquid crystal layer 28, helical turning directions and helical pitches of the cholesteric liquid crystalline phases are the same. The helical pitch is a pitch P described below.

In addition, the discontinuous layer 30 that is provided between the first cholesteric liquid crystal layer 26 and the second cholesteric liquid crystal layer 28 is a layer other than the cholesteric liquid crystal layer having a predetermined thickness.

Although described below, the band pass filter 16 includes a wavelength range where the reflectivity rapidly decreases, that is, a steep transmission wavelength range in the selective reflection wavelength range corresponding to the cholesteric liquid crystal layer. Therefore, the sensor 10 according to the embodiment of the present invention including the band pass filter 16 suppresses incidence of external light becoming noise into the light-receiving element 14 such that high-accuracy measurement of the object O can be performed at a high SN ratio.

In each of the drawings, the thickness, size, and the like of each of the members, the layers, and the regions are appropriately adjusted in order to clearly show the configuration of the present invention and are different from the actual ones of the optical element according to the embodiment of the present invention.

In addition, in the following description, the support 20 side will also be referred to as "lower side", and the second cholesteric liquid crystal layer 28 side will also be referred to as "upper side". Accordingly, in the support 20, the second cholesteric liquid crystal layer 28 side will be referred to as "upper surface", and a side opposite to the second cholesteric liquid crystal layer 28 side will be referred to as "lower surface". In addition, in the alignment film 24, the first cholesteric liquid crystal layer 26, the discontinuous layer 30, and the second cholesteric liquid crystal layer 28, a surface on the support 20 side will be referred to as "lower surface", and a surface opposite to the support 20 side will be referred to as "upper surface".

In the band pass filter 16, the support 20 supports the alignment film 24, the first cholesteric liquid crystal layer 26, the discontinuous layer 30, and the second cholesteric liquid crystal layer 28.

As the support 20, various sheet-shaped materials (films or plate-shaped materials) can be used as long as they can support the alignment film 24 and the cholesteric liquid crystal layer 26.

As the support 20, a support having a sufficient transmittance for the measurement of light by the light-receiving element 14 with respect to the transmission wavelength range of the selective reflection wavelength range of the band pass filter 16 is used. As described above, the band pass filter 16 is a laminate of the first cholesteric liquid crystal layer 26, the discontinuous layer 30, and the second cholesteric liquid crystal layer 28.

The thickness of the support 20 is not particularly limited and may be appropriately set depending on the use of the band pass filter 16, a material for forming the support 20, and the like in a range where the alignment film 24, the first cholesteric liquid crystal layer 26, the discontinuous layer 30, and the second cholesteric liquid crystal layer 28 can be supported.

The thickness of the support 20 is preferably 1 to 2000 µm, more preferably 3 to 500 µm, and still more preferably 5 to 250 m.

The support 20 may have a monolayer structure or a multi-layer structure.

In a case where the support 20 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 20 has a multi-layer structure, examples thereof include a support including: one of the above-described supports having a monolayer structure that is provided as a substrate; and another layer that is provided on a surface of the substrate.

In the band pass filter 16, the alignment film 24 is formed on a surface (upper surface) of the support 20.

The alignment film 24 is an alignment film for aligning a liquid crystal compound 32 to a predetermined alignment state during the formation of the first cholesteric liquid crystal layer 26 of the band pass filter 16.

As the alignment film 24, various well-known films can be used.

Examples of the alignment film 24 include a rubbed film formed of an organic compound such as a polymer, an obliquely deposited film formed of an inorganic compound, a film having a microgroove, a film formed by lamination of Langmuir-Blodgett (LB) films formed with the Langmuir-Blodgett technique using an organic compound such as co-tricosanoic acid, dioctadecylmethylammonium chloride, or methyl stearate, and a photo-alignment film that emits polarized light or non-polarized light to a photo-alignment material.

The alignment film 24 may be formed using a well-known method corresponding to a material for forming the alignment film.

For example, the alignment film formed by a rubbing treatment can be formed by rubbing a surface of a polymer layer with paper or fabric in a given direction multiple times.

As the material used for the alignment film, for example, a material for forming polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

In addition, the support 20 may also function as an alignment film by performing a treatment such as a rubbing treatment or laser processing on the support 20 instead of forming the alignment film 24.

The thickness of the alignment film 24 is not particularly limited. The thickness with which a required alignment function can be obtained may be appropriately set depending on the material for forming the alignment film.

The thickness of the alignment film is preferably 0.01 to 5 µm and more preferably 0.05 to 2 µm.

In the sensor 10 according to the embodiment of the present invention, the band pass filter 16 does not need to include the support 20 and/or the alignment film 24.

For example, after forming the first cholesteric liquid crystal layer 26, the discontinuous layer 30, and the second cholesteric liquid crystal layer 28 on the surface of the alignment film 24, the support 20 may be peeled off or the support 20 and the alignment film 24 may be peeled off. In addition, as described above, the support 20 may also function as the alignment film by performing a rubbing treatment or the like on the support 20.

In the band pass filter 16, the first cholesteric liquid crystal layer 26 is formed on a surface of the alignment film 24, the discontinuous layer 30 is formed on a surface of the first cholesteric liquid crystal layer 26, and the second cholesteric liquid crystal layer 28 is formed on a surface of the discontinuous layer 30.

In FIG. 2, in order to simplify the drawing and to clarify the configuration of the band pass filter 16, only a portion of the first cholesteric liquid crystal layer 26 and the second cholesteric liquid crystal layer 28 corresponding to 180° rotation in the twisted alignment of the liquid crystal compound 32 in the cholesteric liquid crystalline phase is conceptually shown. That is, FIG. 2 shows only ½ pitches of the helical structure of the cholesteric liquid crystalline phase.

Figure 3:
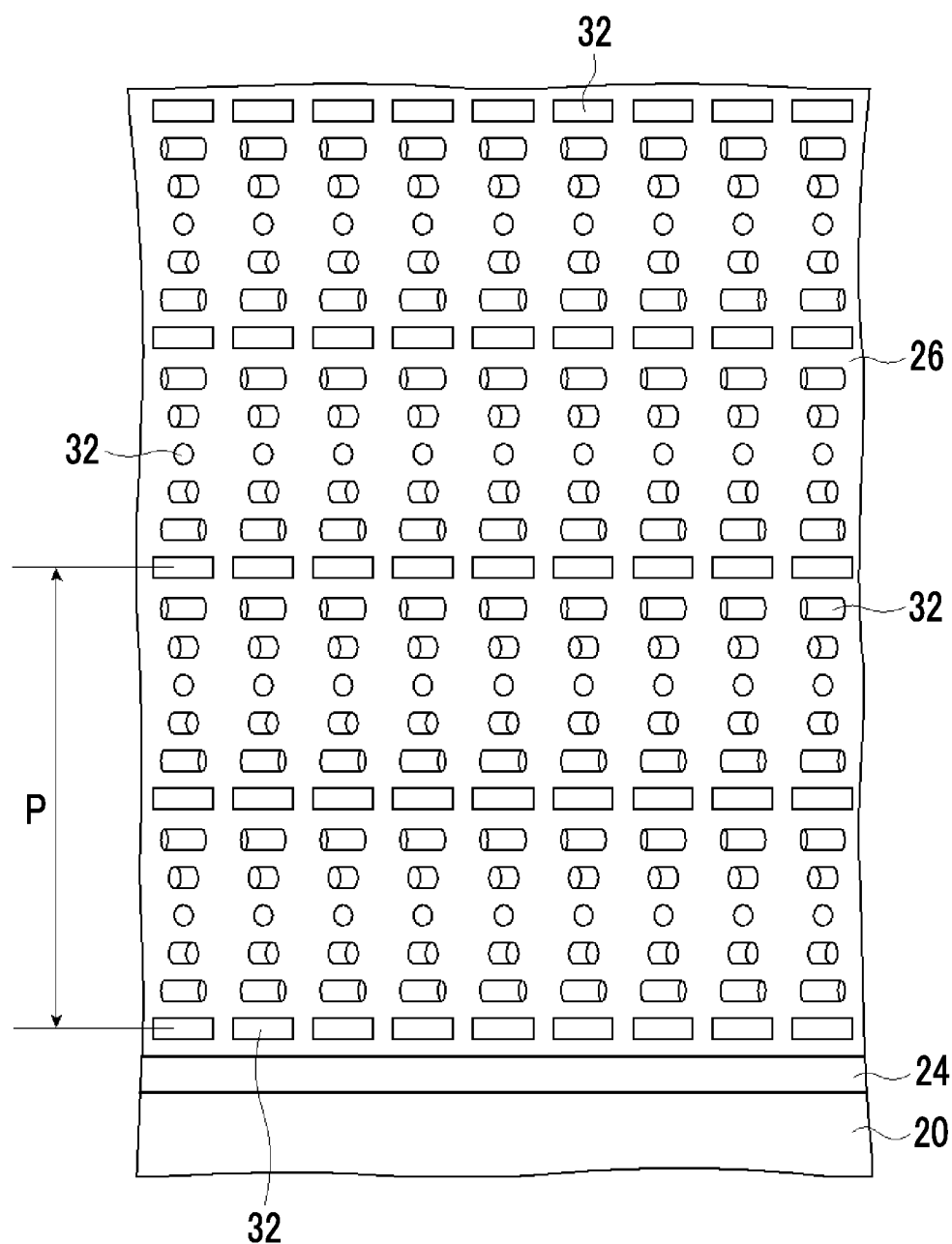
FIG. 3 is a diagram showing a first cholesteric liquid crystal layer of the band pass filter shown in FIG. 2.

However, as shown in FIG. 3 using the first cholesteric liquid crystal layer 26, each of the first cholesteric liquid crystal layer 26 and the second cholesteric liquid crystal layer 28 has a helical structure in which the liquid crystal compound 32 is helically turned and laminated along a helical axis in a thickness direction as in a cholesteric liquid crystal layer obtained by immobilizing a typical cholesteric liquid crystalline phase. In the helical structure, a configuration in which the liquid crystal compound 32 is helically rotated once (rotated by) 360° is set as one helical pitch, and one or more pitches of the helically turned liquid crystal compound 32 are laminated.

That is, in the present invention, the cholesteric liquid crystalline phase (cholesteric liquid crystal layer) refers to a structure in which one or more pitches of the helical structures are laminated. In the cholesteric liquid crystal layer, by laminating one or more pitches of the helical structure formed of the liquid crystal compound 32, reflection properties having wavelength selectivity described below is exhibited.

Accordingly, in the present invention, regarding a layer having a helical structure in which the liquid crystal compound 32 is helically turned and laminated along the helical axis in the thickness direction, in a case where the helical pitch of the layer is less than one pitch, this layer is not a cholesteric liquid crystal layer.

Both of the first cholesteric liquid crystal layer 26 and the second cholesteric liquid crystal layer 28 are obtained by immobilizing a cholesteric liquid crystalline phase. That is, both of the first cholesteric liquid crystal layer 26 and the second cholesteric liquid crystal layer 28 are formed of the liquid crystal compound 32 (liquid crystal material) having a cholesteric structure.

In the following description, in a case where it is not necessary to distinguish between the first cholesteric liquid crystal layer 26 and the second cholesteric liquid crystal layer 28, the first cholesteric liquid crystal layer 26 and the second cholesteric liquid crystal layer 28 will also be collectively referred to as "cholesteric liquid crystal layer".

It is known that the cholesteric liquid crystalline phase exhibits selective reflectivity at a specific wavelength. The center wavelength of selective reflection (selective reflection center wavelength) λc depends on a pitch P of a helical structure in the cholesteric liquid crystalline phase and satisfies a relationship of λc=n×P with an average refractive index n of the cholesteric liquid crystalline phase.

Therefore, the selective reflection center wavelength can be adjusted by adjusting the pitch P of the helical structure. The pitch of the cholesteric liquid crystalline phase depends on the kind of a chiral agent which is used in combination of a liquid crystal compound during the formation of the cholesteric liquid crystal layer, or the concentration of the chiral agent added. Therefore, a desired pitch can be obtained by adjusting the kind and concentration of the chiral agent.

The details of the adjustment of the pitch P can be found in "Fuji Film Research & Development" No. 50 (2005), pp. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

One pitch of the helical structure of the cholesteric liquid crystalline phase has a configuration in which the liquid crystal compound 32 is helically rotated once (360° rotation) and laminated. In addition, the pitch P (helical pitch) in the cholesteric liquid crystalline phase refers to the length in the thickness direction of one pitch of the helical structure in which the liquid crystal compound 32 is helically rotated once and laminated (refer to FIG. 3).

In a case where a cross-section of the cholesteric liquid crystal layer is observed with a scanning electron microscope (SEM), a stripe pattern in which bright lines (bright portions) and dark lines (dark portions) derived from a cholesteric liquid crystalline phase are alternately laminated in the thickness direction is observed. The helical pitch, that is, the pitch P is equal to the length corresponding to three bright lines and two dark lines in the thickness direction, that is, the length corresponding to three dark lines and two bright lines in the thickness direction. This length refers to the inter-center distance of bright lines or dark lines vertically adjacent to each other in the thickness direction.

The cholesteric liquid crystalline phase exhibits selective reflectivity with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected. Accordingly, the helical twisted direction in the cholesteric liquid crystalline phase can be verified by causing right circularly polarized light and/or left circularly polarized light to be incident into the cholesteric liquid crystal layer.

In the first cholesteric liquid crystal layer 26 and the second cholesteric liquid crystal layer 28, helical twisted directions of cholesteric liquid crystalline phases are the same. Accordingly, the first cholesteric liquid crystal layer 26 and the second cholesteric liquid crystal layer 28 reflect circularly polarized light having the same turning direction.

A twisted direction of the cholesteric liquid crystalline phase can be adjusted by adjusting the kind of the liquid crystal compound that forms the cholesteric liquid crystal layer and/or the kind of the chiral agent to be added.

In the cholesteric liquid crystalline phase, a half-width Δλ (nm) of a selective reflection wavelength range (circularly polarized light reflection wavelength range) where selective reflection is exhibited depends on Δn of the cholesteric liquid crystalline phase and the helical pitch P and complies with a relationship of Δλ=Δn×P. Therefore, the width of the selective reflection wavelength range can be controlled by adjusting Δn. Δn can be adjusted by adjusting a kind of a liquid crystal compound for forming the cholesteric liquid crystal layer and a mixing ratio thereof, and a temperature during alignment immobilization.

The half-width of the reflection wavelength range may be appropriately adjusted depending on the use of the band pass filter 16. The half-width of the reflection wavelength range may be, for example, 10 to 500 nm and is preferably 20 to 300 nm and more preferably 30 to 100 nm.

The selective reflection center wavelength and the selective reflection wavelength range in the cholesteric liquid crystal layer are not particularly limited, and may be appropriately set depending on the use of the sensor 10 using the band pass filter 16.

Specifically, in the cholesteric liquid crystal layer, the selective reflection center wavelength and the selective reflection wavelength range may be appropriately set depending on the wavelength of the measurement light used in the sensor 10. Although described below, the sensor 10 receives the light in the transmission wavelength range of the selective wavelength range of the band pass filter 16 with the light-receiving element 14. Accordingly, the selective reflection center wavelength and the selective reflection wavelength range of the cholesteric liquid crystal layer are set such that the transmission wavelength range is included in the wavelength range of the measurement light.

In the present invention, in the first cholesteric liquid crystal layer 26 and the second cholesteric liquid crystal layer 28, the pitches P of the helical structures are the same. Accordingly, in the first cholesteric liquid crystal layer 26 and the second cholesteric liquid crystal layer 28, the selective reflection center wavelengths and/or the selective reflection wavelength ranges are basically the same.

In the present invention, the pitches P being the same does not represent that the pitches P of the first cholesteric liquid crystal layer 26 and the second cholesteric liquid crystal layer 28 completely match each other. That is, the meaning of the pitches P being the same includes an error range that is generally allowable in the technical field. Specifically, the pitches P being the same represents that a difference in length is within ±5%.

The pitch P of the helical structure can be verified by analyzing the stripe pattern in which bright lines and dark lines derived from a cholesteric liquid crystalline phase are alternately laminated in the thickness direction in a case where a cross-section of the cholesteric liquid crystal layer is observed with a SEM.

The cholesteric liquid crystal layer (the first cholesteric liquid crystal layer 26 and the second cholesteric liquid crystal layer 28) can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, it is preferable that the structure in which a cholesteric liquid crystalline phase is immobilized is a structure which is obtained by making the polymerizable liquid crystal compound to be in a state where a cholesteric liquid crystalline phase is aligned, polymerizing and curing the polymerizable liquid crystal compound with ultraviolet emission, heating, or the like to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound 32 in the cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the cholesteric liquid crystal layer obtained by immobilizing a cholesteric liquid crystalline phase include a liquid crystal composition including a liquid crystal compound. It is preferable that the liquid crystal compound is a polymerizable liquid crystal compound. The first cholesteric liquid crystal layer 26 and the second cholesteric liquid crystal layer 28 are formed typically using the same liquid crystal compound.

In addition, the liquid crystal composition used for forming the cholesteric liquid crystal layer may further include a surfactant and a chiral agent.

<<Polymerizable Liquid Crystal Compound (Rod-Shaped Liquid Crystal Compound>>

The polymerizable liquid crystal compound may be a rod-shaped liquid crystal compound or a disk-shaped liquid crystal compound.

Examples of the rod-shaped polymerizable liquid crystal compound for forming the cholesteric liquid crystalline phase include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/022586, WO95/024455, WO97/000600, WO98/023580, WO98/052905, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

<<Disk-Shaped Liquid Crystal Compound>>

As the disk-shaped liquid crystal compound, for example, compounds described in JP2007-108732A and JP2010-244038A can be preferably used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

<<Surfactant>>

The liquid crystal composition used for forming the cholesteric liquid crystal layer may include a surfactant.

It is preferable that the surfactant is a compound that can function as an alignment control agent contributing to the stable or rapid formation of a cholesteric liquid crystalline phase with planar alignment. Examples of the surfactant include a silicone surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

<<Chiral Agent (Optically Active Compound)>>

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to an emission wavelength can be formed by emission of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01 to 200 mol % and more preferably 1 to 30 mol % with respect to the content molar amount of the liquid crystal compound.

<<Polymerization Initiator>>

In a case where the liquid crystal composition includes a polymerizable compound, it is preferable that the liquid crystal composition includes a polymerization initiator. In an aspect where a polymerization reaction progresses with ultraviolet emission, it is preferable that the polymerization initiator is a photopolymerization initiator which initiates a polymerization reaction with ultraviolet emission.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

<<Crosslinking Agent>>

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth) acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3 to 20 mass % and more preferably 5 to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

<<Other Additives>>

Optionally, a polymerization inhibitor, an antioxidant, an ultraviolet absorber, a light stabilizer, a coloring material, metal oxide particles, or the like can be added to the liquid crystal composition in a range where optical performance and the like do not deteriorate.

In a case where the cholesteric liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these organic solvents, one kind may be used alone, or two or more kinds may be used in combination. Among these, a ketone is preferable in consideration of an environmental burden.

In a case where the cholesteric liquid crystal layer (the first cholesteric liquid crystal layer 26 and the second cholesteric liquid crystal layer 28) is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystalline phase, and curing the liquid crystal compound.

For example, in a case where the first cholesteric liquid crystal layer 26 is formed on the alignment film 24, it is preferable that the first cholesteric liquid crystal layer 26 obtained by immobilizing a cholesteric liquid crystalline phase is formed by applying the liquid crystal composition to the alignment film 24, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the cholesteric liquid crystal layer. In the drying and/or heating step, the liquid crystal compound in the liquid crystal composition only has to be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light emission may be performed, and photopolymerization is preferable. Regarding the light emission, ultraviolet light is preferably used. The emission energy is preferably 20 mJ/cm$^2$ to 50 J/cm$^2$ and more preferably 50 to 1500 mJ/cm$^2$. In order to promote a photopolymerization reaction, light emission may be performed under heating conditions or in a nitrogen atmosphere. The wavelength of emitted ultraviolet light is preferably 250 to 430 nm.

The thickness of the cholesteric liquid crystal layer is not particularly limited, and the thickness with which a required light reflectivity can be obtained may be appropriately set depending on the use of the band pass filter 16, the light reflectivity required for the cholesteric liquid crystal layer, the material for forming the cholesteric liquid crystal layer, and the like.

This point will be described below.

As described above, in the band pass filter 16, the first cholesteric liquid crystal layer 26, the discontinuous layer 30, and the second cholesteric liquid crystal layer 28 are provided on the alignment film 24 in order from below.

The discontinuous layer 30 of the band pass filter 16 shown in FIG. 1 is a liquid crystal layer obtained by curing, for example, a composition including the liquid crystal compound 32. This composition does not include a chiral agent. Accordingly, the discontinuous layer 30 is a liquid crystal layer obtained by immobilizing a typical liquid crystal phase in which the liquid crystal compound 32 is not helically twisted and aligned.

In a case where the liquid crystal layer is formed on the liquid crystal layer using an application method, the alignment of the liquid crystal compound on a lower surface of the upper liquid crystal layer follows the alignment of the liquid crystal compound on an upper surface of the lower liquid crystal layer.

Accordingly, the alignment of the liquid crystal compound 32 on the lower surface of the discontinuous layer 30 that is the liquid crystal layer above the first cholesteric liquid crystal layer 26 follows the alignment of the liquid crystal compound 32 on the upper surface of the first cholesteric liquid crystal layer 26. In addition, since the discontinuous layer 30 does not include a chiral agent, as in the typical liquid crystal phase, the discontinuous layer 30 is a layer in which the liquid crystal compound 32 that is aligned as in the liquid crystal compound 32 on the upper surface of the first cholesteric liquid crystal layer 26 is laminated in the thickness direction.

Likewise, the alignment of the liquid crystal compound 32 on the lower surface of the second cholesteric liquid crystal layer 28 formed on the discontinuous layer 30 as the liquid crystal layer follows the alignment of the liquid crystal compound 32 on the upper surface of the discontinuous layer 30 that is the layer below the first cholesteric liquid crystal layer 26. That is, in this example, the discontinuous layer 30 may also function as the alignment film of the second cholesteric liquid crystal layer 28.

Accordingly, in the band pass filter 16, the alignment of the liquid crystal compound 32 is the same on the upper surface of the first cholesteric liquid crystal layer 26, the lower surface and the upper surface of the discontinuous layer 30, and the lower surface of the second cholesteric liquid crystal layer 28.

In a case where the discontinuous layer 30 is not a liquid crystal layer, the alignment film may be necessary in order to align the liquid crystal compound 32 of the second cholesteric liquid crystal layer 28.

In this case, a separate alignment film may be provided on the discontinuous layer 30. Alternatively, a rubbing treatment or the like may be performed on the discontinuous layer 30 such that the discontinuous layer 30 functions as an alignment film. Alternatively, an alignment film may be formed on the surface of the first cholesteric liquid crystal layer 26 such that this alignment film functions as the discontinuous layer 30.

Both of the first cholesteric liquid crystal layer 26 and the second cholesteric liquid crystal layer 28 are cholesteric liquid crystal layers obtained by immobilizing a cholesteric liquid crystalline phase. In addition, in the first cholesteric liquid crystal layer 26 and the second cholesteric liquid crystal layer 28, helical turning directions of the liquid crystal compound 32 in the cholesteric liquid crystalline phase are the same, and pitches P (helical pitches) of the single periods of the helical structures are the same. That is, light components reflected from the first cholesteric liquid crystal layer 26 and the second cholesteric liquid crystal layer 28 are circularly polarized light components having the same wavelength range and the same turning direction.

In the following description, for convenience of description, the configuration in which the helical turning directions of the liquid crystal compounds 32 of the cholesteric liquid crystalline phases are the same and the helical pitches of the helical structures are the same will also be referred to as "the helical senses and pitches are the same".

On the other hand, the discontinuous layer 30 is a layer other than the cholesteric liquid crystal layer that is positioned between the first cholesteric liquid crystal layer 26 and the second cholesteric liquid crystal layer 28. That is, the discontinuous layer 30 is a layer that makes the first cholesteric liquid crystal layer 26 and the second cholesteric liquid crystal layer 28 in which the helical senses and pitches are the same discontinuous.

In the band pass filter 16 used in the sensor 10 according to the embodiment of the present invention, the first cholesteric liquid crystal layer 26, the discontinuous layer 30, and the second cholesteric liquid crystal layer 28 function as a filter.

In the following description, for convenience of description, the first cholesteric liquid crystal layer 26, the discontinuous layer 30, and the second cholesteric liquid crystal layer 28 will also be referred to as "filter laminate".

The filter laminate in which the discontinuous layer 30 is provided between the first cholesteric liquid crystal layer 26 and the second cholesteric liquid crystal layer 28 where the helical senses and pitches are the same exhibits optical characteristics different from those of a typical cholesteric liquid crystal layer.

Figure 4:
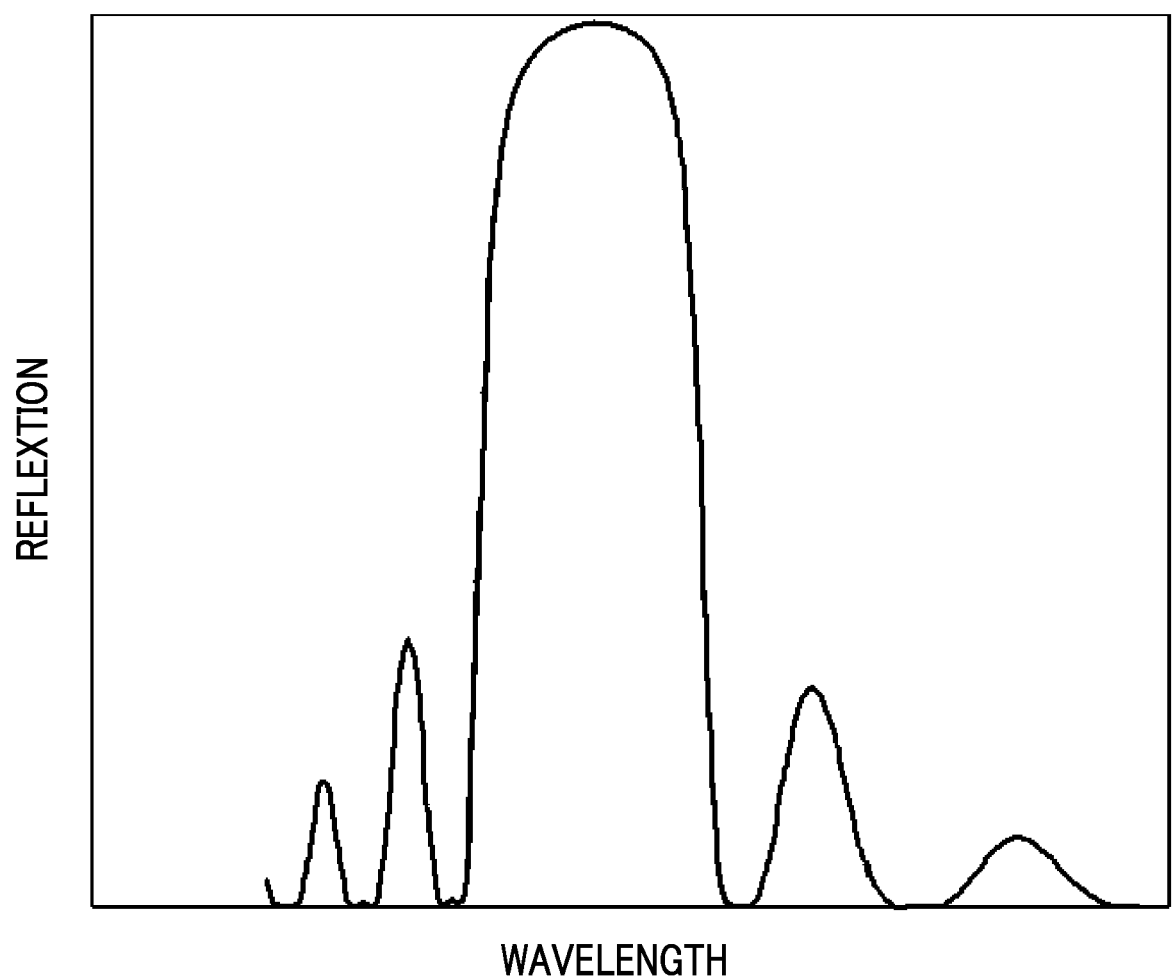
FIG. 4 is a graph conceptually showing an example of light reflection properties of a typical cholesteric liquid crystal layer.
Figure 5:
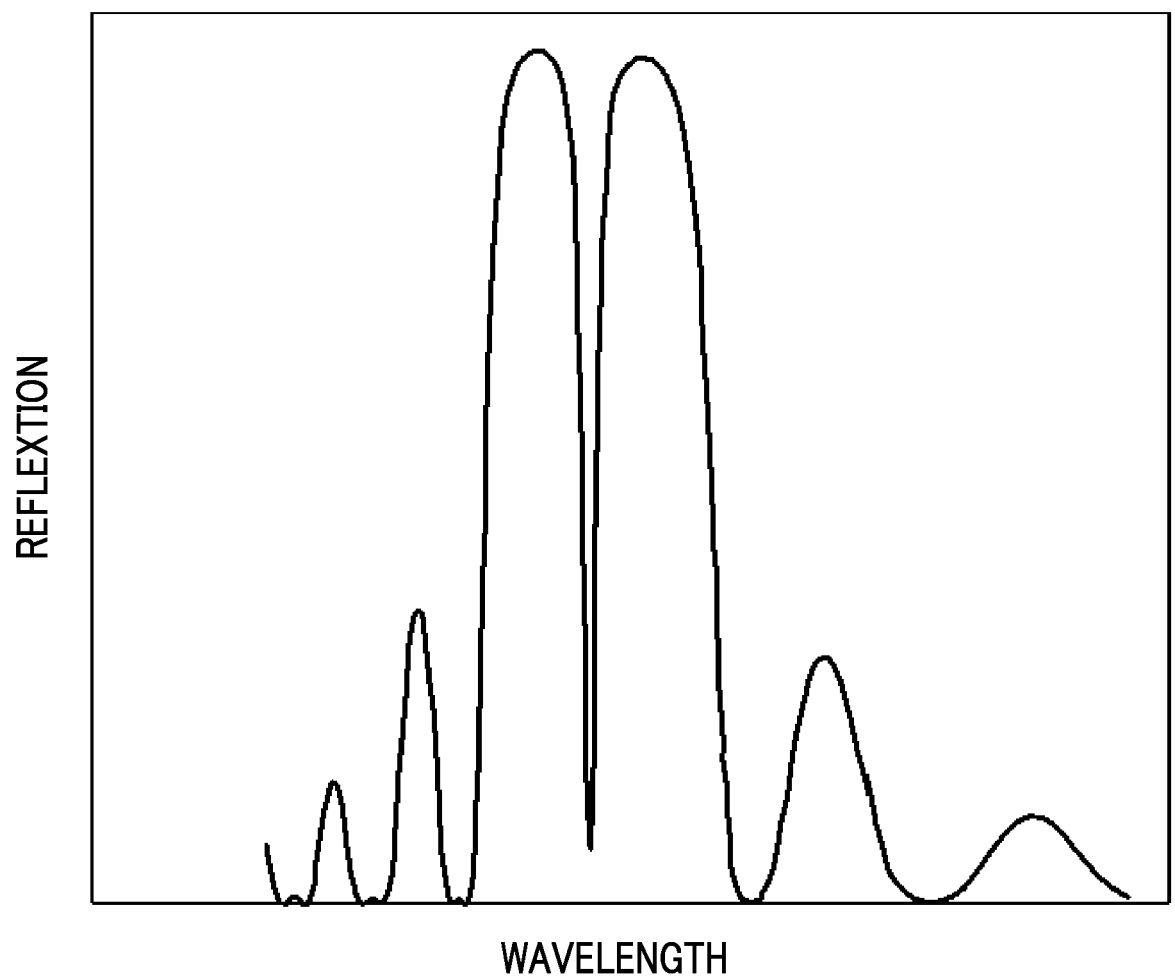
FIG. 5 is a graph conceptually showing an example of light reflection properties of the band pass filter according to the present invention.

FIG. 4 conceptually shows reflection characteristics of a general cholesteric liquid crystal layer. In FIG. 4 and FIG. 5 described below, the horizontal axis represents a wavelength, and the vertical axis represents a normalized value of a reflectivity.

The cholesteric liquid crystal layer has wavelength selectivity in reflection, and thus reflects light in a wavelength range near the selective reflection center wavelength at a substantially uniformly high reflectivity as shown in FIG. 4.

On the other hand, in the filter laminate of the band pass filter 16 of the sensor 10 according to the embodiment of the present invention, the discontinuous layer 30 that is not a cholesteric liquid crystal layer is provided between the first cholesteric liquid crystal layer 26 and the second cholesteric liquid crystal layer 28 where the helical senses and pitches are the same. In other words, in the band pass filter 16, a defect portion in which the turning of the liquid crystal compound 32 in the thickness direction is not continuous is present between the first cholesteric liquid crystal layer 26 and the second cholesteric liquid crystal layer 28.

Therefore, in the filter laminate, even in a case where the helical senses and pitches are the same, each of the first cholesteric liquid crystal layer 26 and the second cholesteric liquid crystal layer 28 reflects light in a predetermined wavelength range. Due to the reflection of the light, in the filter laminate including the discontinuous layer 30, the light reflected from the first cholesteric liquid crystal layer 26 interferes with the light reflected from the second cholesteric liquid crystal layer 28.

As a result, in the filter laminate, as conceptually shown in FIG. 5, a wavelength (wavelength range) where the reflectivity rapidly decreases is shown in the selective reflection wavelength range regarding the reflection characteristics of the light. In the wavelength range where the reflectivity decreases, light transmits.

That is, in the selective reflection wavelength range of the first cholesteric liquid crystal layer 26 and the second cholesteric liquid crystal layer 28 of the filter laminate, predetermined circularly polarized light is reflected as in the typical cholesteric liquid crystal layer, whereas light selectively transmits in a narrow wavelength range of the selective reflection wavelength range.

Accordingly, the sensor 10 according to the embodiment of the present invention using the band pass filter 16 including the filter laminate causes the measurement light reflected from the object O to be incident into the light-receiving element 14 through the band pass filter 16 such that the light incident into the light-receiving element 14 is only the light in a narrow wavelength range transmitted through the band pass filter 16.

Therefore, in the sensor 10 according to the embodiment of the present invention, only predetermined light in a narrow wavelength range can be made to be incident into the light-receiving element 14 without shielding external light with the band pass filter 16. Therefore, noise generated from external light can be significantly reduced, and high-accuracy measurement of the object O can be performed at a high SN ratio.

As the sensor 10 according to the embodiment of the present invention, a sensor including not only the members shown in the drawing but also a polarizer and/or a phase difference plate (for example, a λ/4 plate) can be preferably used.

In the band pass filter 16 including the first cholesteric liquid crystal layer 26 and the second cholesteric liquid crystal layer 28, only circularly polarized light in a predetermined turning direction reflected from the cholesteric liquid crystal layer can be shielded.

Accordingly, in the sensor 10 according to the embodiment of the present invention, by causing light to be incident into the band pass filter 16 through the polarizer and/or the phase difference plate, it is preferable that only circularly polarized light in a predetermined turning direction is incident into the band pass filter 16. In particular, in a case where the light source 12 emits unpolarized light, it is preferable that the sensor 10 according to the embodiment of the present invention includes both of the polarizer and the phase difference plate. In particular, in a case where the light source 12 emits linearly polarized light, it is preferable that the sensor 10 according to the embodiment of the present invention includes the phase difference plate.

In addition, the sensor according to the embodiment of the present invention may include, as the band pass filter, two band pass filters in which the helical twisted directions of the cholesteric liquid crystal layers are different from each other and the helical pitches of the cholesteric liquid crystal layers are the same. That is, the sensor according to the embodiment of the present invention may include, as the band pass filter, two band pass filters in which the selective reflection wavelength ranges are the same and the turning directions of circularly polarized light to be reflected are different from each other.

Specifically, the sensor according to the embodiment of the present invention can also be suitably configured to include two band pass filters including the first band pass filter and the second band pass filter, in which, in the first cholesteric liquid crystal layer and the second cholesteric liquid crystal layer of the first band pass filter and the first cholesteric liquid crystal layer and the second cholesteric liquid crystal layer of the second band pass filter, helical twisted directions are different from each other and helical pitches are the same. In the present invention, in the first cholesteric liquid crystal layer and the second cholesteric liquid crystal layer of the band pass filter, helical twisted directions and helical pitches of the cholesteric liquid crystalline phases are the same.

In the configuration including the two band pass filters, the polarizer and/or the phase difference plate is unnecessary, and both of right circularly polarized light and left circularly polarized light can be handled. Therefore, the polarization dependence can be reduced, and the amount of incidence light required for the measurement into the light-receiving element 14 can also be improved.

Further, in the configuration including the two band pass filters, both of right circularly polarized light and left circularly polarized light can be handled. Therefore, a difference between the maximum reflectivity in the selective reflection wavelength range of the cholesteric liquid crystal layer and the minimum reflectivity in the steep transmission wavelength range of the selective reflection wavelength range can be expanded. As a result, in this configuration, the effect of reducing noise light in the selective reflection wavelength range of the cholesteric liquid crystal layer can be improved.

Regarding the above-described point, the same can also be applied to a case where a band pass filter 60 shown in FIG. 14 described below.

In the band pass filter 16 used in the sensor 10 according to the embodiment of the present invention, in a case where the wavelength having the lowest reflectivity in the selective reflection wavelength range of the band pass filter 16 is represented by λm [nm], the thickness [nm] of the discontinuous layer 30 is in a range of $$30\times(\lambda m/550) \text{ to } 150\times(\lambda m/550).$$

In a case where the thickness of the discontinuous layer 30 is less than 30×(λm/550) nm, the effect obtained by providing the discontinuous layer 30 is not sufficiently exhibited, and the wavelength range of steep reflectivity decrease cannot be obtained in the selective reflection wavelength range of the band pass filter 16.

In a case where the thickness of the discontinuous layer 30 is more than 150×(λm/550), there is a problem in that, for example, the wavelength range of steep reflectivity decrease cannot be obtained in the selective reflection wavelength range of the band pass filter 16 or the reflectivity in the wavelength range of steep reflectivity decrease increases in the selective reflection wavelength range.

The thickness [nm] of the discontinuous layer 30 is preferably 40×(λm/550) to 140×(λm/550) and more preferably 50×(λm/550) to 130×(λm/550).

In the band pass filter 16, the wavelength range where the reflectivity steeply decreases in the selective reflection wavelength range is affected by the thickness of the discontinuous layer 30. That is, in the band pass filter 16, the wavelength range where light transmits in the selective reflection wavelength range is affected by the thickness of the discontinuous layer 30.

Basically, as the thickness of the discontinuous layer 30 increases, the wavelength of the wavelength range where the reflectivity decreases in the selective reflection wavelength range is shifted to a longer wavelength side.

Accordingly, the thickness of the discontinuous layer 30 may be appropriately set depending on the wavelength that is measured by the light-receiving element 14.

In the example shown in FIG. 2, the discontinuous layer 30 is a liquid crystal layer in which the liquid crystal compound 32 is aligned as in the upper surface of the first cholesteric liquid crystal layer 26. However, in the present invention, the discontinuous layer 30 is not limited to this example.

That is, as long as the discontinuous layer 30 is a layer other than a cholesteric liquid crystal layer, various layers that can make the first cholesteric liquid crystal layer 26 and the second cholesteric liquid crystal layer 28 discontinuous can be used.

Examples of the discontinuous layer 30 include an optically-isotropic layer.

The optically-isotropic layer is a layer that has no optical anisotropy. Specifically, the optically-isotropic layer is preferably a layer in which an in-plane retardation at a wavelength of 550 nm is 3 nm or less and a thickness-direction retardation at a wavelength of 550 nm is 3 nm or less.

The optically-isotropic layer as the discontinuous layer 30 may be formed using a well-known isotropic material and a well-known method corresponding to the material, and examples of the isotropic material include acryl, modified cellulose, polyamide, epoxy, polyacetal, acryl, polystyrene, polyurethane, polyvinyl alcohol, polyvinyl formal, polyamide, polyester, polyethyleneimine, polyallylamine, and polyalkylene glycol.

In addition, an optically-anisotropic layer can also be used as the discontinuous layer 30.

Here, examples of the optically-anisotropic layer include a layer in which an in-plane retardation at a wavelength of 550 nm is more than 3 nm and a layer in which a thickness-direction retardation at a wavelength of 550 nm is more than 3 nm.

Preferable examples of the optically-anisotropic layer include a well-known A-Plate and a well-known C-plate. In particular, the A-Plate such as the optically-anisotropic layer formed of the above-described liquid crystal layer is suitably used as the discontinuous layer 30.

In addition, the discontinuous layer 30 only needs to be a layer other than a cholesteric liquid crystal layer. As described above, the cholesteric liquid crystal layer is a layer in which one or more pitches of the liquid crystal compound 32 that is helically turned is laminated. Accordingly, in the present invention, in a case where the discontinuous layer 30 includes less than one pitch of a helical structure, the discontinuous layer 30 may have a helical structure in which the liquid crystal compound 32 is helically turned and laminated along the helical axis in the thickness direction.

As described above, the thicknesses of the first cholesteric liquid crystal layer 26 and the second cholesteric liquid crystal layer 28 forming the band pass filter 16 are not limited. Accordingly, the thicknesses of the first cholesteric liquid crystal layer 26 and the second cholesteric liquid crystal layer 28 may be appropriately set depending on the selective reflection wavelength range of the band pass filter 16, the reflectivity required for the band pass filter 16, and the like.

In the filter laminate in which the discontinuous layer 30 is provided between the first cholesteric liquid crystal layer 26 and the second cholesteric liquid crystal layer 28 where the helical senses and pitches are the same, as the thicknesses of the first cholesteric liquid crystal layer 26 and the second cholesteric liquid crystal layer 28 increase, the width of the wavelength range where the reflectivity steeply decreases becomes narrower. That is, in the filter laminate, as the thicknesses of the first cholesteric liquid crystal layer 26 and the second cholesteric liquid crystal layer 28 increase, the wavelength range of light transmits in the reflection wavelength range becomes narrower.

Accordingly, in a case where the wavelength range of the light that transmits through the band pass filter 16 is narrow, it is preferable that the thicknesses of the first cholesteric liquid crystal layer 26 and the second cholesteric liquid crystal layer 28 are large. Conversely, in a case where it is desired to make the wavelength range of the light that transmits through the band pass filter 16 narrow, it is preferable that the thicknesses of the first cholesteric liquid crystal layer 26 and the second cholesteric liquid crystal layer 28 are small. In a case where the thicknesses of the first cholesteric liquid crystal layer 26 and the second cholesteric liquid crystal layer 28 are excessively large, most part of the light is reflected. Therefore, the wavelength range where which the reflectivity rapidly decreases is not generated in the selective reflection wavelength range.

The thicknesses of the first cholesteric liquid crystal layer 26 and the second cholesteric liquid crystal layer 28 are preferably 2 to 10 pitches, more preferably 3 to 9 pitches, and still more preferably 4 to 8 pitches in terms of the number of helical pitches.

The thicknesses of the first cholesteric liquid crystal layer 26 and the second cholesteric liquid crystal layer 28 may be the same as or different from each other.

For example, the band pass filter 16 can be prepared as follows.

First, the alignment film 24 is formed using a well-known method, for example, by preparing the support 20, forming a resin layer on a surface of the support 20, and performing a rubbing treatment.

Next, the liquid crystal composition including the polymerizable liquid crystal compound, the chiral agent, and the polymerization initiator is applied to the alignment film 24 and is cured by heating and ultraviolet emission. As a result, the first cholesteric liquid crystal layer 26 as the cholesteric liquid crystal layer is formed.

Next, the same liquid crystal composition as that of the first cholesteric liquid crystal layer 26 except that it does not include the chiral agent is applied to the first cholesteric liquid crystal layer 26 and is cured by heating and ultraviolet emission. As a result, the discontinuous layer 30 is formed.

As described above, in a case where the liquid crystal layer is formed on the liquid crystal layer, the alignment of the liquid crystal compound of the upper liquid crystal layer follows the alignment of the liquid crystal compound on the surface of the lower liquid crystal layer. In addition, the liquid crystal composition for forming the discontinuous layer 30 does not include the chiral agent. Therefore, the liquid crystal compound 32 is not helically twisted and aligned in the thickness direction.

Therefore, in the discontinuous layer 30, the liquid crystal compound 32 is aligned as in the upper surface of the first cholesteric liquid crystal layer 26 in the plane direction, and the liquid crystal compound 32 that is aligned in the same direction is laminated in the thickness direction without being twisted and aligned.

Next, the second cholesteric liquid crystal layer 28 is formed on the discontinuous layer 30 using the same method as that of the first cholesteric liquid crystal layer 26. In a case where the liquid crystal layer is formed on the liquid crystal layer, the alignment of the liquid crystal compound of the upper liquid crystal layer follows the alignment of the liquid crystal compound on the surface of the lower liquid crystal layer.

Therefore, the second cholesteric liquid crystal layer 28 is a cholesteric liquid crystal layer in which the liquid crystal compound 32 on the lower surface is aligned as in the upper surface of the discontinuous layer 30 and is helically turned in the thickness direction.

Accordingly, in the filter laminate of the band pass filter 16, as shown in FIG. 1, the liquid crystal compound 32 is aligned in the same manner on the upper surface of the first cholesteric liquid crystal layer 26, the lower surface and the upper surface of the discontinuous layer 30, and the lower surface of the second cholesteric liquid crystal layer 28.

In a case where the discontinuous layer 30 is not a liquid crystal layer, as described above, the alignment film may be formed on the discontinuous layer 30, or a rubbing treatment may be performed on the discontinuous layer 30 such that the discontinuous layer 30 functions as the alignment film.

As is well known, in a case where light incident into the cholesteric liquid crystal layer from an oblique direction, so-called short-wavelength shift (blue shift) in which the selective reflection wavelength range is shifted to a shorter wavelength side occurs.

The oblique direction is a direction having an angle with respect to a direction (normal direction) perpendicular to the main surface of the cholesteric liquid crystal layer, and the front direction is a direction perpendicular to the main surface of the cholesteric liquid crystal layer.

In the sensor 10 according to the embodiment of the present invention, in a case where light is incident into the band pass filter 16 from an oblique direction, the wavelength range of transmitted light is shifted to a shorter wavelength side due to the short-wavelength shift of the cholesteric liquid crystal layer. As a result, light having an unintended wavelength transmits through the band pass filter 16 to be incident into the light-receiving element 14 such that the light becomes noise.

In the sensor according to the embodiment of the present invention, in order to avoid this problem, it is preferable that a lens element for allowing light to be incident into the band pass filter 16 from the front direction is provided between the light source 12 and the band pass filter 16.

Figure 6:
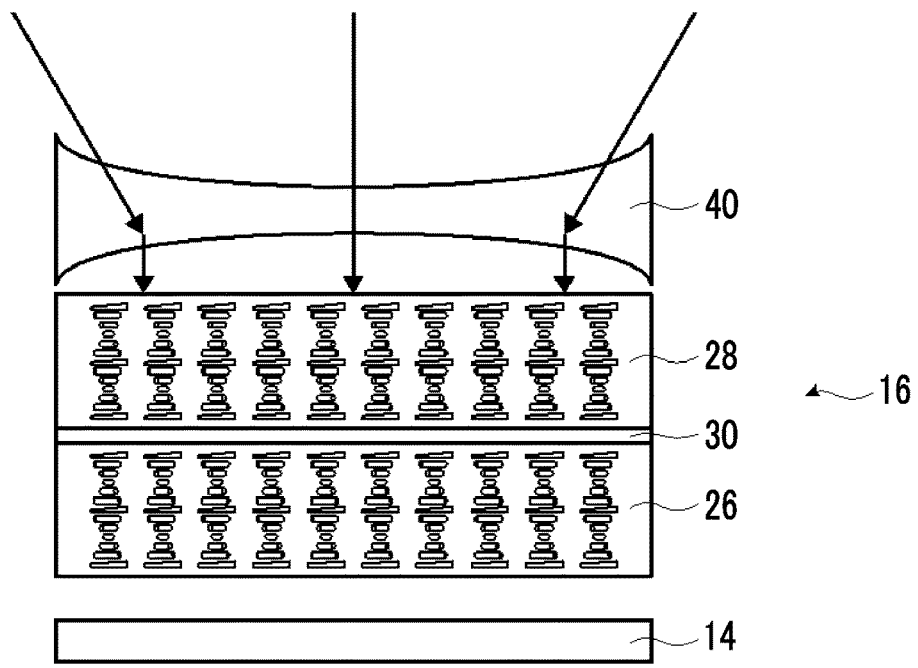
FIG. 6 is a diagram conceptually showing another example of the sensor according to the present invention.
Figure 7:
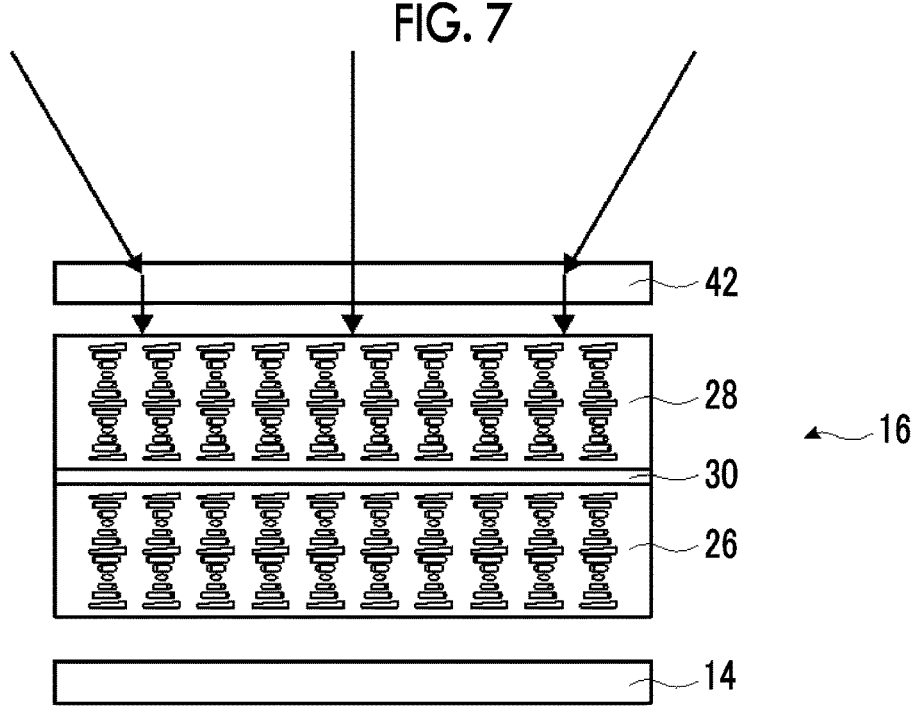
FIG. 7 is a diagram conceptually showing still another example of the sensor according to the present invention.

As conceptually shown in FIG. 6, for example, a concave lens 40 can be used as the lens element. In FIG. 6 and FIG. 7 described below, in order to simplify the drawings, only the filter laminate is shown as the band pass filter 16. As described above, the filter laminate is a laminate of the first cholesteric liquid crystal layer 26, the discontinuous layer 30, and the second cholesteric liquid crystal layer 28.

By providing the concave lens 40 between the light source 12 and the band pass filter 16, even in a case where light is incident into the band pass filter 16 from various directions as shown in FIG. 7, light can be made to be incident into the band pass filter 16 from the front surface.

FIG. 6 shows the concave lens 40 in which both surfaces are concave, but a concave lens in which only a single surface is concave can also be used.

As the lens element, for example, a diffraction element (diffractive lens) that refracts incidence light by diffraction can also be used as shown in FIG. 7.

As the diffraction element, a well-known diffraction element such as a diffraction element by surface relief or a diffraction element by diffraction hologram can be used. From the viewpoint of reducing the thickness, for example, a liquid crystal diffraction element is suitably used. For example, FIG. 7 shows a liquid crystal diffraction element 42.

In particular, a liquid crystal diffraction element is preferable, the liquid crystal diffraction element including an optically-anisotropic layer that is formed using a liquid crystal composition including a liquid crystal compound and has a liquid crystal alignment pattern in which a direction of an optical axis derived from the liquid crystal compound changes while continuously rotating in at least one in-plane direction. In particular, a liquid crystal diffraction element can be suitably used, in which a length over which the direction of the optical axis rotates by 180° in the one in-plane direction in which the optical axis continuously rotates in the optically anisotropic liquid crystal alignment pattern is set as a single period, the length of the single period in the liquid crystal alignment pattern gradually decreases in the one in-plane direction in which the optical axis continuously rotates.

Figure 8:
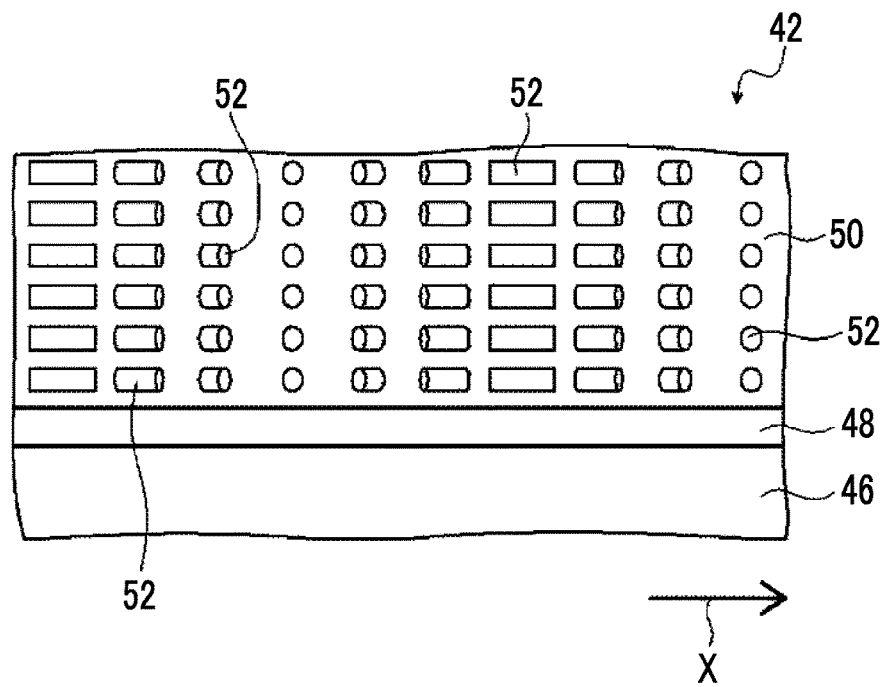
FIG. 8 is a diagram conceptually showing an example of a liquid crystal diffraction element.

FIG. 8 conceptually shows an example of the liquid crystal diffraction element.

As shown in FIG. 8, the liquid crystal diffraction element 42 includes a support 46, an alignment film 48, and an optically-anisotropic layer 50.

As the support 46, various sheet-shaped materials (films or plate-shaped materials) can be used as long as they can support the alignment film 24 and the optically-anisotropic layer 50. As the support 46, a transparent support is preferable, and the same support as the above-described support 20 can be used.

In the liquid crystal diffraction element 42, the alignment film 48 is formed on a surface of the support 46.

The alignment film 24 is an alignment film for aligning a liquid crystal compound 52 to the predetermined liquid crystal alignment pattern during the formation of the optically-anisotropic layer 50 of the liquid crystal diffraction element 42.

Although described below, in the liquid crystal diffraction element 42 according to the embodiment of the present invention, the optically-anisotropic layer 50 has a liquid crystal alignment pattern in which a direction of an optical axis 52A (refer to FIG. 10) derived from the liquid crystal compound 52 changes while continuously rotating in one in-plane direction (arrow X direction described below). Accordingly, the alignment film 48 of the liquid crystal diffraction element 42 is formed such that the optically-anisotropic layer 50 can form the liquid crystal alignment pattern.

As the alignment film 48, the same alignment film as the above-described alignment film 24 can be used.

In particular, a so-called photo-alignment film obtained by irradiating a photo-alignment material with polarized light or non-polarized light can be suitably used. That is, in the liquid crystal diffraction element 42, a photo-alignment film that is formed by applying a photo-alignment material to the support 46 is suitably used as the alignment film.

A method of forming the alignment film is not limited. Any one of various well-known methods corresponding to a material for forming the alignment film can be used. For example, a method including: applying the alignment film to a surface of the support 20; drying the applied alignment film; and exposing the alignment film to laser light to form an alignment pattern can be used.

The liquid crystal diffraction element 42 does not need to include the alignment film 48.

For example, the following configuration can also be adopted, in which, by forming the alignment pattern on the support 46 using a method of rubbing the support 46, a method of processing the support 46 with laser light or the like, or the like, the optically-anisotropic layer 50 or the like as the liquid crystal alignment pattern in which the direction of the optical axis 52A derived from the liquid crystal compound 52 changes while continuously rotating in at least one in-plane direction.

In the liquid crystal diffraction element 42, the optically-anisotropic layer 50 is formed on a surface of the alignment film 48.

In the liquid crystal diffraction element 42, the optically-anisotropic layer 50 is formed using the composition including the liquid crystal compound. In a case where an in-plane retardation value is set as $\lambda/2$, the optically-anisotropic layer 50 has a function of a general $\lambda/2$ plate, that is, a function of imparting a phase difference of a half wavelength, that is, 180° to two linearly polarized light components in light incident into the optically-anisotropic layer and are perpendicular to each other.

The optically-anisotropic layer 50 has the liquid crystal alignment pattern in which the direction of the optical axis 52A derived from the liquid crystal compound 52 changes while continuously rotating in the one in-plane direction indicated by arrow X in a plane of the optically-anisotropic layer. In the optically-anisotropic layer 50, the direction of the liquid crystal compound 52 (optical axis 52A) matches the thickness direction.

The optical axis 52A derived from the liquid crystal compound 52 is an axis having the highest refractive index in the liquid crystal compound 52, that is, a so-called slow axis. For example, in a case where the liquid crystal compound 52 is a rod-shaped liquid crystal compound, the optical axis 52A is along a rod-shaped major axis direction.

In the following description, "one in-plane direction indicated by arrow X" will also be simply referred to as "arrow X direction". In addition, in the following description, the optical axis 52A derived from the liquid crystal compound 52 will also be referred to as "the optical axis 52A of the liquid crystal compound 52" or "the optical axis 52A".

Figure 10:
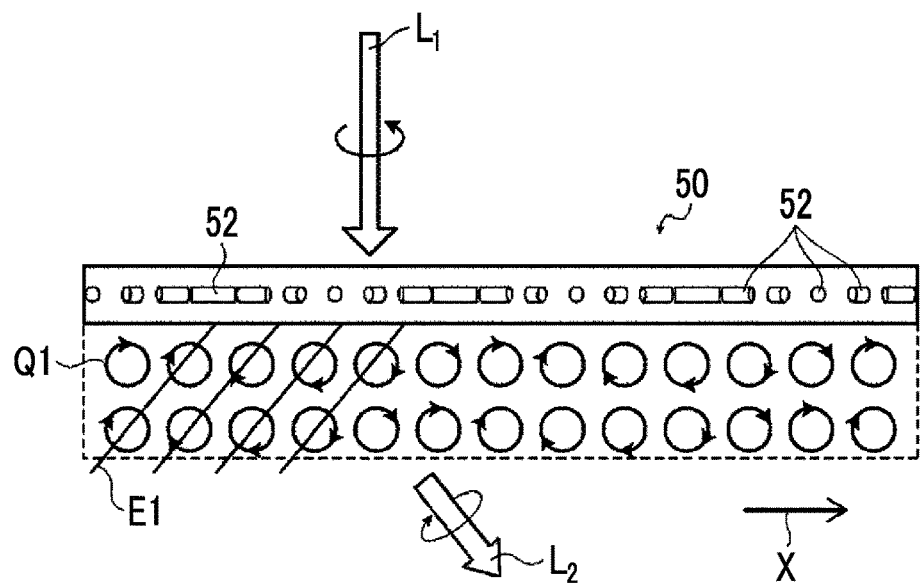
FIG. 10 is a conceptual diagram showing an action of the liquid crystal diffraction element shown in FIG. 8.
Figure 11:
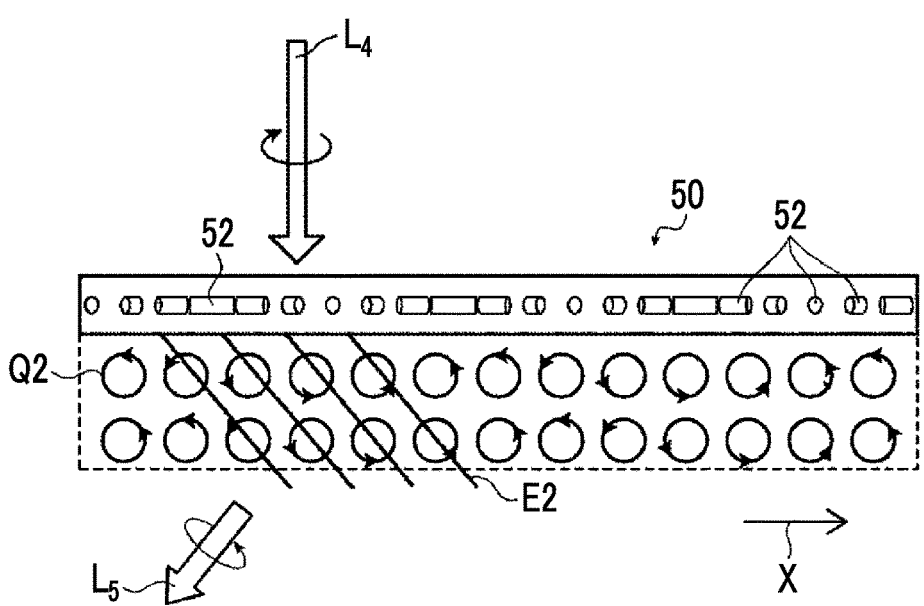
FIG. 11 is a conceptual diagram showing the action of the liquid crystal diffraction element shown in FIG. 8.

In the optically-anisotropic layer 50, the liquid crystal compound 52 is two-dimensionally arranged in a plane parallel to the arrow X direction and a Y direction perpendicular to the arrow X direction. In FIGS. 8, 10, and 11 described below, the Y direction is a direction perpendicular to the plane.

Figure 9:
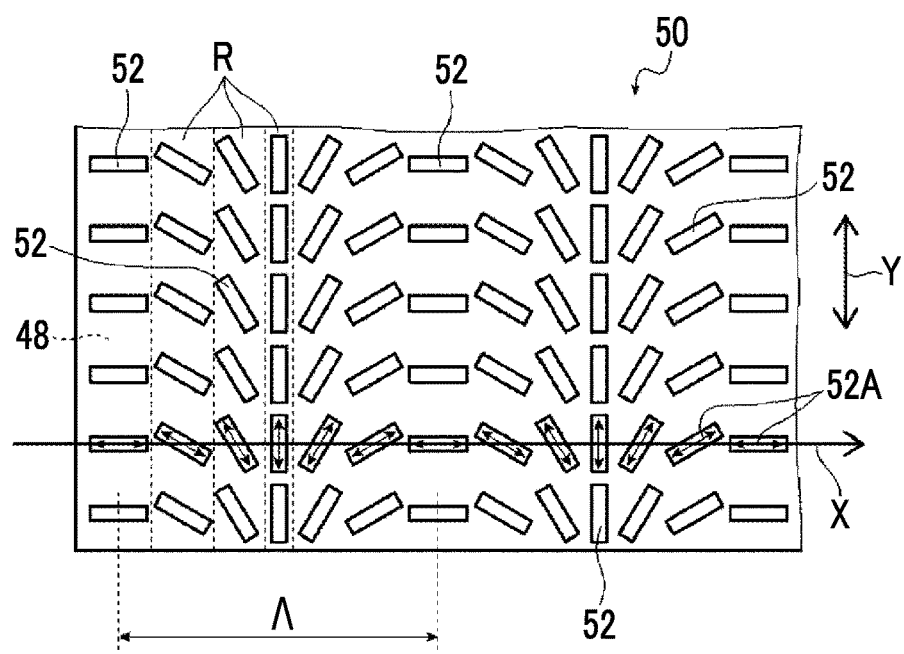
FIG. 9 is a schematic plan view showing the liquid crystal diffraction element shown in FIG. 8.

FIG. 9 conceptually shows a plan view of the optically-anisotropic layer 50.

The plan view is a view in a case where the liquid crystal diffraction element 42 is seen from the top in FIG. 8, that is, a view in a case where the liquid crystal diffraction element 42 is seen from a thickness direction (laminating direction of the respective layers (films)). In other words, the plan view is a view in a case where the optically-anisotropic layer 50 is seen from a direction perpendicular to a main surface.

In addition, in FIG. 9, in order to clarify the configuration of the liquid crystal diffraction element 42 according to the embodiment of the present invention, only the liquid crystal compound 52 on the surface of the alignment film 24 is shown. However, in the thickness direction, as shown in FIG. 8, the optically-anisotropic layer 50 has the structure in which the liquid crystal compound 52 on the surface of the alignment film 24 is laminated.

The optically-anisotropic layer 50 has the liquid crystal alignment pattern in which the direction of the optical axis 52A derived from the liquid crystal compound 52 changes while continuously rotating in the arrow X direction in a plane.

Specifically, "the direction of the optical axis 52A of the liquid crystal compound 52 changes while continuously rotating in the arrow X direction (the predetermined one in-plane direction)" represents that an angle between the optical axis 52A of the liquid crystal compound 52, which is arranged in the arrow X direction, and the arrow X direction varies depending on positions in the arrow X direction, and the angle between the optical axis 52A and the arrow X direction sequentially changes from θ to θ+180° or θ−180° in the arrow X direction.

On the other hand, in a state where the direction of the optical axis 52A is uniform, the liquid crystal compounds 52 forming the optically-anisotropic layer 50 are arranged at regular intervals in the Y direction perpendicular to the arrow X direction, that is, the Y direction perpendicular to the one in-plane direction in which the optical axis 52A continuously rotates.

In other words, regarding the liquid crystal compound 52 forming the optically-anisotropic layer 50, in the liquid crystal compounds 52 arranged in the Y direction, angles between the directions of the optical axes 52A and the arrow X direction are the same.

In the liquid crystal alignment pattern of the liquid crystal compound 52 of the optically-anisotropic layer 50, the length (distance) over which the optical axis 52A of the liquid crystal compound 52 rotates by 180° in the arrow X direction in which the direction of the optical axis 52A changes while continuously rotating in a plane is the length Λ of the single period in the liquid crystal alignment pattern. In the following description, the length Λ of the single period will also be referred to as "single period Λ". In other words, the single period Λ in the liquid crystal alignment pattern is defined as the distance between θ and θ+180° that is a range of the angle between the optical axis 52A of the liquid crystal compound 52 and the arrow X direction.

That is, a distance between centers of two liquid crystal compounds 52 in the arrow X direction is the single period Λ, the two liquid crystal compounds having the same angle in the arrow X direction. Specifically, as shown in FIG. 9, a distance of centers in the arrow X direction of two liquid crystal compounds 52 in which the arrow X direction and the direction of the optical axis 52A match each other is the single period Λ.

In the liquid crystal diffraction element 42, in the liquid crystal alignment pattern of the optically-anisotropic layer, the single period Λ is repeated in the arrow X direction, that is, in the one in-plane direction in which the direction of the optical axis 52A changes while continuously rotating. In addition, in the liquid crystal diffraction element 42, the single period Λ gradually decreases in the arrow X direction or in a direction opposite to the arrow X direction.

As described above, in the liquid crystal compounds arranged in the Y direction in the optically-anisotropic layer, the angles between the optical axes 52A and the arrow X direction (the one in-plane direction in which the direction of the optical axis of the liquid crystal compound 52 rotates) are the same. Regions where the liquid crystal compounds 52 in which the angles between the optical axes 52A and the arrow X direction are the same are disposed in the Y direction will be referred to as "regions R".

In this case, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the liquid crystal compound 52 in the direction of the optical axis 52A and a refractive index of the liquid crystal compound 52 in a direction perpendicular to the optical axis 52A in a plane of the region R. That is, the difference Δn in refractive index is the same as the difference in refractive index of the liquid crystal compound.

In a case where circularly polarized light is incident into the above-described optically-anisotropic layer 50, the light is refracted such that the direction of the circularly polarized light is converted.

This action is conceptually shown in FIG. 10. In the optically-anisotropic layer 50, the value of the product of the difference in refractive index of the liquid crystal compound and the thickness of the optically-anisotropic layer is λ/2.

In FIG. 10 and FIG. 11 described below, in order to simplify the drawing and to clarify the configuration of the liquid crystal diffraction element 42, only the liquid crystal compound 52 (liquid crystal compound molecules) on the surface of the alignment film in the optically-anisotropic layer 50 is shown. However, as conceptually shown in FIG. 8, the first optically-anisotropic layer 50 has a structure in which the aligned liquid crystal compounds 52 are laminated in the thickness direction as in an optically-anisotropic layer that is formed using a composition including a typical liquid crystal compound.

As shown in FIG. 10, in a case where the value of the product of the difference in refractive index of the liquid crystal compound in the optically-anisotropic layer 50 and the thickness of the optically-anisotropic layer 50 is λ/2 and incidence light $L_1$ as left circularly polarized light is incident into the optically-anisotropic layer 50, the incidence light $L_1$ transmits through the optically-anisotropic layer 50 to be imparted with a phase difference of 180°, and the transmitted light $L_2$ is converted into right circularly polarized light.

In addition, in a case where the incidence light $L_1$ transmits through the optically-anisotropic layer 50, an absolute phase thereof changes depending on the direction of the optical axis 52A of each of the liquid crystal compounds 52. In this case, the direction of the optical axis 52A changes while rotating in the arrow X direction. Therefore, the amount of change in the absolute phase of the incidence light $L_1$ varies depending on the direction of the optical axis 52A. Further, the liquid crystal alignment pattern that is formed in the optically-anisotropic layer 50 is a pattern that is periodic in the arrow X direction. Therefore, as shown in FIG. 10, the incidence light $L_1$ transmitted through the optically-anisotropic layer 50 is imparted with an absolute phase Q1 that is periodic in the arrow X direction corresponding to the direction of each of the optical axes 52A. As a result, an equiphase surface E1 that is tilted in a direction opposite to the arrow X direction is formed.

Therefore, the transmitted light $L_2$ is refracted to be tilted in a direction perpendicular to the equiphase surface E1 and travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrow X direction with respect to an incidence direction.

On the other hand, as conceptually shown in FIG. 11, in a case where the value of the product of the difference in refractive index of the liquid crystal compound in the optically-anisotropic layer 50 and the thickness of the optically-anisotropic layer 50 is λ/2 and incidence light $L_4$ as right circularly polarized light is incident into the optically-anisotropic layer 50, the incidence light $L_4$ transmits through the optically-anisotropic layer 50 to be imparted with a phase difference of 180° and is converted into transmitted light $L_5$ of left circularly polarized light.

In addition, in a case where the incidence light $L_4$ transmits through the optically-anisotropic layer 50, an absolute phase thereof changes depending on the direction of the optical axis 52A of each of the liquid crystal compounds 52. In this case, the direction of the optical axis 52A changes while rotating in the arrow X direction. Therefore, the amount of change in the absolute phase of the incidence light $L_4$ varies depending on the direction of the optical axis 52A. Further, the liquid crystal alignment pattern that is formed in the optically-anisotropic layer 50 is a pattern that is periodic in the arrow X direction. Therefore, as shown in FIG. 11, the incidence light $L_4$ transmitted through the optically-anisotropic layer 50 is imparted with an absolute phase Q2 that is periodic in the arrow X direction corresponding to the direction of each of the optical axes 52A.

Here, the incidence light $L_4$ is right circularly polarized light. Therefore, the absolute phase Q2 that is periodic in the arrow X direction corresponding to the direction of the optical axis 52A is opposite to the incidence light $L_1$ as left circularly polarized light. As a result, in the incidence light $L_4$, an equiphase surface E2 that is tilted in the arrow X direction opposite to that of the incidence light $L_1$ is formed.

Therefore, the incidence light $L_4$ is refracted to be tilted in a direction perpendicular to the equiphase surface E2 and travels in a direction different from a traveling direction of the incidence light $L_4$. This way, the incidence light $L_4$ is converted into the transmitted light $L_5$ of left circularly polarized light that is tilted by a predetermined angle in a direction opposite to the arrow X direction with respect to an incidence direction.

Here, as the above-described single period Λ decreases, the size of tilt in an emission direction with respect to a light incidence direction increases.

As described above, in the liquid crystal diffraction element 42, the single period Λ gradually decreases in the arrow X direction or in a direction opposite to the arrow X direction. Accordingly, the size of tilt in the emission direction with respect to the light incidence direction increases in the arrow X direction or the direction opposite to the arrow X direction.

The optically-anisotropic layer 50 is formed by curing a liquid crystal composition including a rod-shaped liquid crystal compound or a disk-shaped liquid crystal compound, and has a liquid crystal alignment pattern in which an optical axis of the rod-shaped liquid crystal compound or an optical axis of the disk-shaped liquid crystal compound is aligned as described above.

By forming the alignment film 48 on the support 46, applying the liquid crystal composition to the alignment film 48, and curing the applied liquid crystal composition, the optically-anisotropic layer 50 formed of the cured layer of the liquid crystal composition can be obtained. Although the optically-anisotropic layer 50 functions as a so-called λ/2 plate, the present invention also includes an aspect where a laminate including the support 46 and the alignment film 48 that are integrated functions as a so-called λ/2 plate.

In addition, the liquid crystal composition for forming the optically-anisotropic layer 50 includes a rod-shaped liquid crystal compound or a disk-shaped liquid crystal compound and may further include other components such as a leveling agent, an alignment control agent, a polymerization initiator, or an alignment assistant.

As materials of these components, the same materials as those of the above-described cholesteric liquid crystal layer can be used. In this case, the liquid crystal composition for forming the optically-anisotropic layer 50 does not include a chiral agent.

In the liquid crystal diffraction element 42, the thickness of the optically-anisotropic layer 50 is not particularly limited and, from the viewpoint of reducing the thickness of a light irradiating device 100, is preferably 20 µm or less, more preferably 15 µm or less, still more preferably 10 µm or less, and still more preferably 5 µm or less.

In the liquid crystal diffraction element 42 shown in FIGS. 8 to 11, the optical axis 52A of the liquid crystal compound 52 in the liquid crystal alignment pattern of the optically-anisotropic layer 50 continuously rotates only in the arrow X direction.

However, the liquid crystal diffraction element used in the present invention is not limited thereto, and various configurations can be used as long as the optical axis 52A of the liquid crystal compound 52 in the optically-anisotropic layer continuously rotates in at least one in-plane direction.

Figure 12:
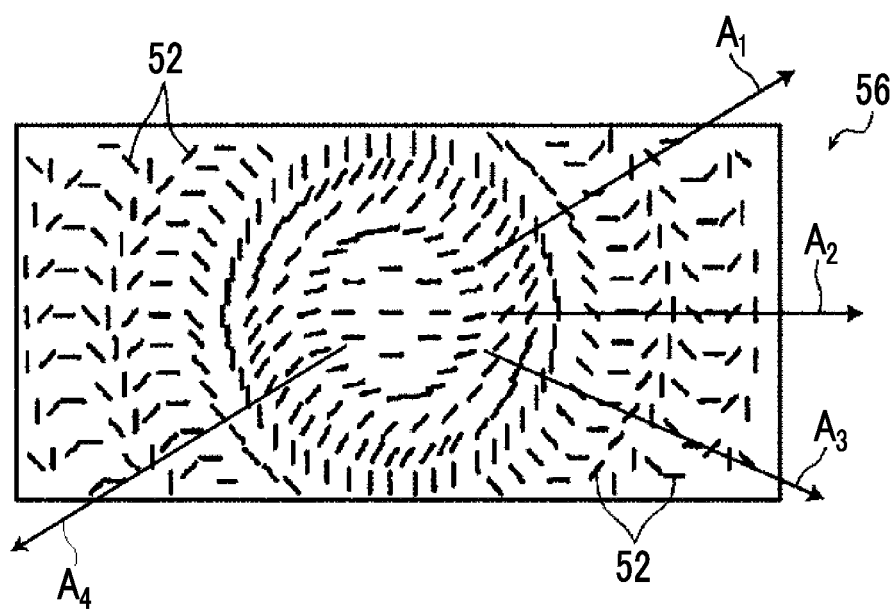
FIG. 12 is a schematic plan view showing another example of the liquid crystal diffraction element.

In a preferable example, as conceptually shown in a plan view of FIG. 12, an optically-anisotropic layer 56 having the liquid crystal alignment pattern can be used. The liquid crystal alignment pattern in the optically-anisotropic layer 56 shown in FIG. 12 is a concentric circular pattern having a concentric circular shape where the one in-plane direction in which the direction of the optical axis of the liquid crystal compound 52 changes while continuously rotating moves from an inside toward an outside.

In other words, the liquid crystal alignment pattern of the optically-anisotropic layer 56 shown in FIG. 12 is a liquid crystal alignment pattern where the one in-plane direction in which the direction of the optical axis of the liquid crystal compound 52 changes while continuously rotating is provided in a radial shape from the center of the optically-anisotropic layer 56.

FIG. 12 shows only the liquid crystal compound 52 of the surface of the alignment film as in FIG. 9. However, as shown in FIG. 8, the optically-anisotropic layer 56 has the structure in which the liquid crystal compound 52 on the surface of the alignment film is laminated as described above.

In addition, FIG. 12 shows only the liquid crystal compound 52 in order to simplify the drawing. In the example shown in FIG. 12, the liquid crystal compound 52 is a rod-shaped liquid crystal compound, and the direction of the optical axis matches a longitudinal direction of the liquid crystal compound 52.

In the optically-anisotropic layer 56, the direction of the optical axis of the liquid crystal compound 52 changes while continuously rotating in a direction in which a large number of optical axes move to the outside from the center of the optically-anisotropic layer 56, for example, a direction indicated by an arrow $A_1$, a direction indicated by an arrow $A_2$, a direction indicated by an arrow $A_3$, a direction indicated by an arrow $A_4$, or . . . .

In circularly polarized light incident into the optically-anisotropic layer 56 having the above-described liquid crystal alignment pattern, the absolute phase changes depending on individual local regions having different directions of optical axes of the liquid crystal compound 52. In this case, the amount of change in absolute phase varies depending on the directions of the optical axes of the liquid crystal compound 52 into which circularly polarized light is incident.

In the optically-anisotropic layer 56, the rotation direction of the optical axis of the liquid crystal compound 52 is the same as all the directions (one in-plane direction). In the example shown in the drawing, in all the directions including the direction indicated by the arrow $A_1$, the direction indicated by the arrow $A_2$, the direction indicated by the arrow $A_3$, and the direction indicated by the arrow $A_4$, the rotation direction of the optical axis of the liquid crystal compound 52 is counterclockwise.

That is, in a case where the arrow $A_1$ and the arrow $A_4$ is assumed as one straight line, the rotation direction of the optical axis of the liquid crystal compound 52 at the center of the optically-anisotropic layer 56 is reversed. For example, the straight line formed by the arrow $A_1$ and the arrow $A_4$ is directed in the right direction (arrow $A_1$ direction) in the drawing. In this case, the optical axis of the liquid crystal compound 52 rotates clockwise from the outer direction of the optically-anisotropic layer 56 to the center thereof, the rotation direction is reversed at the center of the optically-anisotropic layer 56, and then the optical axis of the liquid crystal compound 52 rotates counterclockwise from the center of the optically-anisotropic layer 56 to the outer direction thereof.

As described above, in the optically-anisotropic layer (liquid crystal optical element) having the liquid crystal alignment pattern in which the direction of the optical axis of the liquid crystal compound 52 changes while continuously rotating in the one in-plane direction, a refraction direction of transmitted light depends on the rotation direction of the optical axis of the liquid crystal compound 52. That is, in this liquid crystal alignment pattern, in a case where the rotation direction of the optical axis of the liquid crystal compound 52 is reversed, the refraction direction of transmitted light is also reversed with respect to the one in-plane direction in which the optical axis rotates.

Accordingly, in the optically-anisotropic layer 56 having the concentric circular liquid crystal alignment pattern, that is, the liquid crystal alignment pattern in which the optical axis changes while continuously rotating in a radial shape, transmission of a plurality of incidence light components (light beams) can be dispersed or converged depending on the rotation direction of the optical axis of the liquid crystal compound 52 and the turning direction of circularly polarized light to be incident.

That is, by setting the liquid crystal alignment pattern of the optically-anisotropic layer in a concentric circular shape, the liquid crystal diffraction element 42 exhibits, for example, a function as a convex lens or a concave lens.

In a case where the liquid crystal alignment pattern of the optically-anisotropic layer is concentric circular such that the liquid crystal optical element functions as a concave lens, it is preferable that the length of the single period Λ over which the optical axis rotates by 180° in the liquid crystal alignment pattern gradually decreases from the center of the optically-anisotropic layer 56 toward the outer direction in the one in-plane direction by reversing the direction in which the optical axis continuously rotates.

As described above, the refraction angle of light with respect to an incidence direction increases as the length of the single period Λ in the liquid crystal alignment pattern decreases. Accordingly, the length of the single period Λ in the liquid crystal alignment pattern gradually decreases from the center of the optically-anisotropic layer 56 toward the outer direction in the one in-plane direction in which the optical axis continuously rotates. As a result, the light diverging power of the optically-anisotropic layer 56 can be improved, and the performance as a concave lens can be improved.

The disposition position of the lens element such as the concave lens 40 and the liquid crystal diffraction element 42 may be present between the light source 12 and the band pass filter 16 and is preferably close to the band pass filter 16. It is preferable that the lens element is provided as near the band pass filter 16 as possible in the sensor 10.

In the sensor 10 according to the embodiment of the present invention, the band pass filter 16 allows transmission of light in a wavelength range other than the selective reflection wavelength range of the cholesteric liquid crystal layer (the first cholesteric liquid crystal layer 26 and the second cholesteric liquid crystal layer 28).

Therefore, in a case where the light-receiving element 14 has sensitivity to the shorter wavelength side and/or the longer wavelength side than the selective reflection wavelength range of the cholesteric liquid crystal layer and in a case where the light in the wavelength range is incident into the band pass filter 16, the incident light transmits through the band pass filter 16 and is measured by the light-receiving element 14 such that noise is generated and the SN ratio decreases.

Figure 13:
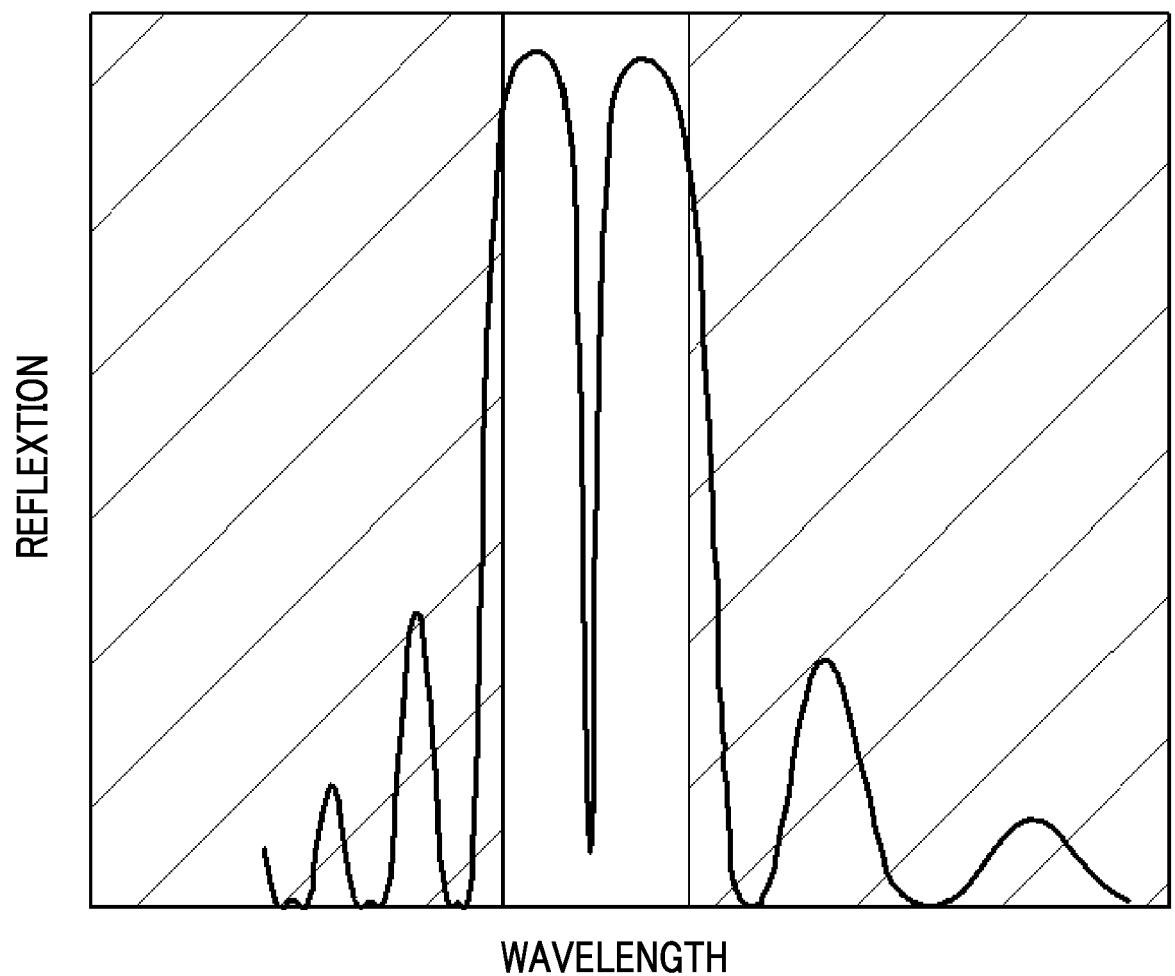
FIG. 13 is a conceptual diagram showing an example of a light shielding member used in the sensor according to the present invention.

In order to prevent the problem, in the sensor 10 according to the embodiment of the present invention, as conceptually indicated by an oblique line in FIG. 13, it is preferable to provide a light shielding member that shields light in a wavelength range that overlaps at least a part of the selective reflection wavelength range of the band pass filter 16, the wavelength range being at least one of a longer wavelength range or a shorter wavelength range than a wavelength having the lowest reflectivity in the selective reflection wavelength range of the band pass filter 16. The wavelength having the lowest reflectivity in the selective reflection wavelength range of the band pass filter 16 is preferably the transmission wavelength range of the selective reflection wavelength range of the band pass filter 16.

As a result, light in a wavelength range other than the selective reflection wavelength range of the cholesteric liquid crystal layer is prevented from being incident into the light-receiving element 14 such that the SN ratio can be prevented from decreasing.

As the light shielding member, various well-known filters can be used. Accordingly, light shielding from the light shielding member may be absorption or reflection.

In the present invention the light shielding member is not limited to the band pass filter that shields light on both of a longer wavelength side and a shorter wavelength side than the transmission wavelength range of the selective reflection wavelength range of the band pass filter 16 as shown in FIG. 13.

That is, the light shielding member may be a low pass filter that shields light only on a longer wavelength side than the transmission wavelength range of the selective reflection wavelength range of the band pass filter 16. Alternatively, the light shielding member may be a high pass filter that shields light only on a shorter wavelength side than the transmission wavelength range of the selective reflection wavelength range of the band pass filter 16.

However, from the viewpoint that light becoming noise can be more suitably prevented from being incident into the light-receiving element 14, it is preferable that the light shielding member is a band pass filter as shown in FIG. 13.

The disposition position of the light shielding member may be present between the light source 12 and the light-receiving element 14. It is preferable that the disposition position of the light shielding member is near the light-receiving element 14.

The band pass filter 16 used in the first aspect of the sensor 10 according to the embodiment of the present invention includes the discontinuous layer 30 that is provided between the first cholesteric liquid crystal layer 26 and the second cholesteric liquid crystal layer 28.

On the other hand, in the band pass filter used in the second aspect of the sensor according to the embodiment of the present invention, the first cholesteric liquid crystal layer 26 and the second cholesteric liquid crystal layer 28 are in direct contact with each other without providing the discontinuous layer 30.

In a case where a cross-section of the band pass filter is observed with a SEM, the configuration in which the first cholesteric liquid crystal layer 26 and the second cholesteric liquid crystal layer 28 are in direct contact with each other can be verified by observing that the stripe pattern in which bright lines and dark lines derived from a cholesteric liquid crystalline phase are alternately laminated in the thickness direction is discontinuous.

Figure 14:
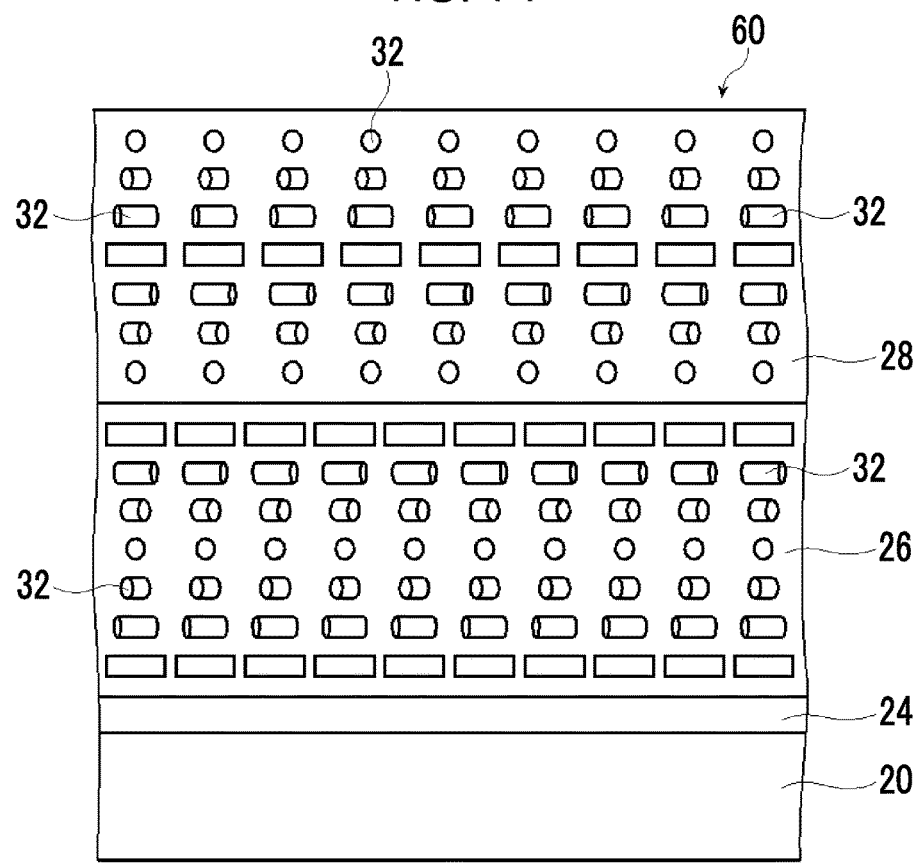
FIG. 14 is a diagram conceptually showing another example of the band pass filter used in the sensor according to the present invention.

FIG. 14 conceptually shows an example of the band pass filter.

In the band pass filter 60 shown in FIG. 14, many of the same members as those of the band pass filter 16 shown in FIG. 2 are used. Therefore, the same members are represented by the same reference numerals, and different points will be mainly described below.

In addition, in the sensor according to the second aspect of the present invention including the band pass filter 60, for example, in the sensor 10 according to the first aspect of the present invention shown in FIG. 1, the band pass filter 60 shown in FIG. 14 is provided instead of the band pass filter 16.

As shown in FIG. 14, in the band pass filter 60, the second cholesteric liquid crystal layer 28 is provided in direct contact with the first cholesteric liquid crystal layer 26. As described above, the first cholesteric liquid crystal layer 26 and the second cholesteric liquid crystal layer 28 are cholesteric liquid crystal layers in which the helical senses and pitches are the same and the same circularly polarized light is reflected.

Here, in the band pass filter 60, an angle between the optical axes of the liquid crystal compounds 32 on contact surfaces of the first cholesteric liquid crystal layer 26 and the second cholesteric liquid crystal layer 28 is 45° to 90°. That is, the optical axes of the liquid crystal compounds 32 facing each other at an interface between the first cholesteric liquid crystal layer 26 and the second cholesteric liquid crystal layer 28 intersect with each other at an angle of 45° to 90°.

In the example shown in the drawing, the liquid crystal compound 32 is, for example, a rod-shaped liquid crystal compound, and the optical axis matches the longitudinal direction.

That is, in the first cholesteric liquid crystal layer 26 and the second cholesteric liquid crystal layer 28 of the band pass filter 60, the turning of the helical liquid crystal compounds 32 is discontinuous, and a discontinuous portion is present at the interface between both of the regions. In other words, a defect portion in which the turning of the liquid crystal compound 32 in the thickness direction is not continuous is present between the first cholesteric liquid crystal layer 26 and the second cholesteric liquid crystal layer 28.

Accordingly, even in this configuration, light reflected from the first cholesteric liquid crystal layer 26 and light reflected from the second cholesteric liquid crystal layer 28 interfere with each other. Therefore, even in this configuration, due to the same effect as that of the band pass filter 16 shown in FIG. 2, a wavelength (wavelength range) where the reflectivity rapidly decreases in the selective reflection wavelength range of the cholesteric liquid crystal layer is shown. As a result, similarly, the narrow wavelength range where light selectively transmits in the selective reflection wavelength range is formed.

Accordingly, even in a case where the band pass filter 60 is used, light incident into the light-receiving element 14 is only the light in a narrow wavelength range transmitted through the band pass filter 60.

Therefore, even in the second aspect of the sensor according to the embodiment of the present invention, similarly, only predetermined light in a narrow wavelength range can be made to be incident into the light-receiving element 14 without shielding external light with the band pass filter 60. Therefore, noise generated from external light can be significantly reduced, and high-accuracy measurement of the object O can be performed at a high SN ratio.

In the band pass filter 60, the angle between the optical axes of the liquid crystal compounds 32 on the contact surfaces of the first cholesteric liquid crystal layer 26 and the second cholesteric liquid crystal layer 28 is 45° to 90°.

In a case where the angle between the optical axes of the liquid crystal compounds 32 is less than 45°, the first cholesteric liquid crystal layer 26 and the second cholesteric liquid crystal layer 28 cannot be made to be suitably discontinuous, and the narrow wavelength range where light selectively transmits cannot be formed in the selective reflection wavelength range.

The angle between the optical axes of the liquid crystal compounds 32 on the contact surface of the first cholesteric liquid crystal layer 26 and the second cholesteric liquid crystal layer 28 is preferably 70° to 90° and most preferably 90°.

The band pass filter 60 can be prepared, for example, by preparing two films including cholesteric liquid crystal layers in which the alignment directions of the liquid crystal compounds are different and the helical senses and pitches are the same, peeling the alignment film 24 and the support 20 of one of the films, and laminating and compressing the cholesteric liquid crystal layers.

Hereinabove, the sensor according to the embodiment of the present invention has been described above. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

(Formation of Alignment Film)

A glass substrate was used as the support. The following coating liquid for forming an alignment film was applied to the support by spin coating. The support on which the coating film of the coating liquid for forming an alignment film was formed was dried using a hot plate at 60° C. for 60 seconds. As a result, an alignment film P-1 was formed.

| Coating Liquid for Forming Alignment Film | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

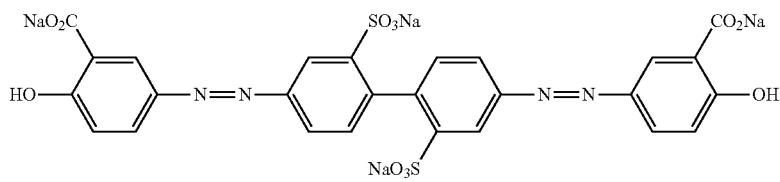

-Material for Photo-Alignment- (Exposure of Alignment Film)

By irradiating the obtained alignment film P-1 with polarized ultraviolet light (50 mJ/cm², using an extra high pressure mercury lamp), the alignment film was exposed.

(Formation of First Cholesteric Liquid Crystal Layer)

As the liquid crystal composition, the following composition A-1 was prepared. This composition A-1 is a liquid crystal composition forming a cholesteric liquid crystal layer (cholesteric liquid crystalline phase) that has a selective reflection center wavelength of 630 nm and reflects right circularly polarized light.

| Composition A-1 | |
|---|---|
| Rod-shaped liquid crystal compound L-1 | 100.00 parts by mass |
| Polymerization initiator (IRGACURE (registered trade name) 907, manufactured by BASF SE) | 3.00 parts by mass |

| -continued | |
|---|---|
| Composition A-1 | |
| Photosensitizer (KAYACURE DETX-S, manufactured by Nippon Kayaku Co., Ltd.) | 1.00 part by mass |
| Chiral agent Ch-1 | 4.72 parts by mass |
| Leveling agent T-1 | 0.08 parts by mass |
| Methyl ethyl ketone | 254.00 parts by mass |

Rod-shaped liquid crystal compound L-1

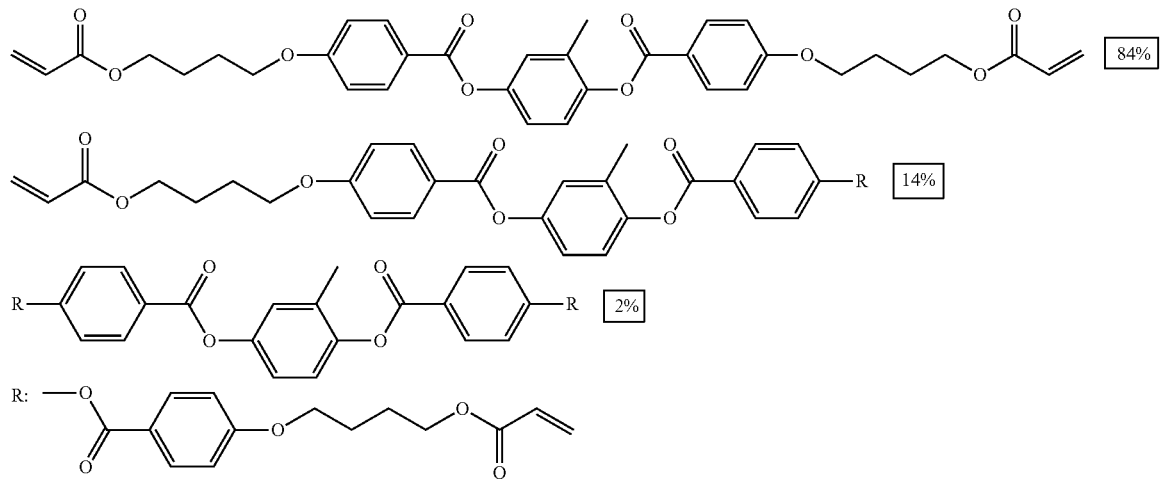

Chiral Agent Ch-1

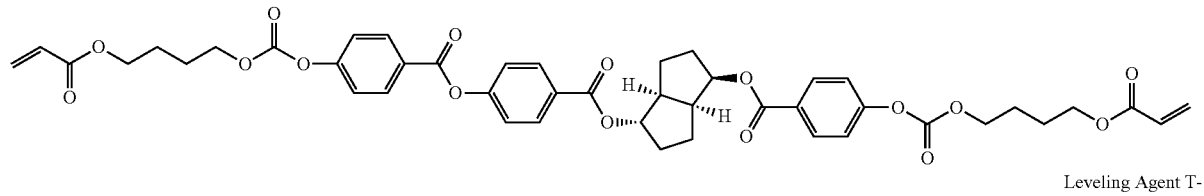

Leveling Agent T-1

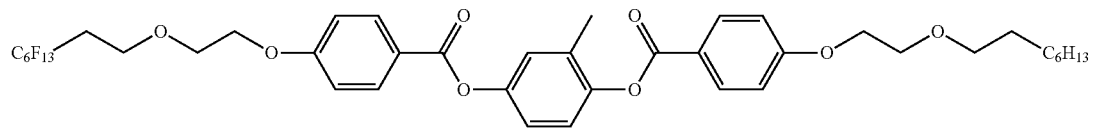

The first cholesteric liquid crystal layer was formed by applying the composition A-1 to the alignment film P-1. The applied coating film was heated using a hot plate at 95° C., the coating film was cooled to 80° C., and the coating film was irradiated with ultraviolet light having a wavelength of 365 nm at an irradiation dose of 300 mJ/cm² using a high-pressure mercury lamp in a nitrogen atmosphere. As a result, the alignment of the liquid crystal compound was immobilized.

In a case where a cross-section of the first cholesteric liquid crystal layer was observed with a SEM, the cholesteric liquid crystalline phase had 6 pitches.

(Formation of Discontinuous Layer)

As the liquid crystal composition forming the discontinuous layer of the cholesteric liquid crystal layer, the following composition A-2 was prepared. The composition A-2 is a liquid crystal composition for forming an anisotropic layer that is not twisted.

| Composition A-2 | |
|---|---|
| Rod-shaped liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 5100.00 parts by mass |

The discontinuous layer of the cholesteric liquid crystal layer was formed by applying multiple layers of the composition A-2 to the first cholesteric liquid crystal layer. The alignment direction of the liquid crystal compound in the discontinuous layer is the same as the alignment direction on the uppermost surface of the cholesteric liquid crystal layer as the lower layer.

After the application of the composition A-2, the coating film was heated to 95° C. using a hot plate and then was cooled to 80° C. Next, the coating film was irradiated with ultraviolet light having a wavelength of 365 nm at an irradiation dose of 300 mJ/cm$^2$ using a high-pressure mercury lamp in a nitrogen atmosphere. As a result, the alignment of the liquid crystal compound was immobilized, and the discontinuous layer (anisotropic layer) was formed. The thickness of the discontinuous layer was 110 nm.

(Formation of Second Cholesteric Liquid Crystal Layer)

The second cholesteric liquid crystal layer was formed by applying multiple layers of the composition A-1 to the discontinuous layer.

After the application of the composition A-1, the coating film was heated to 95° C. using a hot plate and then was cooled to 80° C. Next, the coating film was irradiated with ultraviolet light having a wavelength of 365 nm at an irradiation dose of 300 mJ/cm$^2$ using a high-pressure mercury lamp in a nitrogen atmosphere. As a result, the alignment of the liquid crystal compound was immobilized, and the second cholesteric liquid crystal layer was formed.

In a case where a cross-section of the second cholesteric liquid crystal layer was observed with a SEM, the cholesteric liquid crystalline phase had 6 pitches.

(Evaluation of Band Pass Filter)

Reflection (transmission) characteristics of the band pass filter (cholesteric liquid crystal layer) prepared in Example 1 were measured using a spectrophotometer (UV-3150, manufactured by Shimadzu Corporation). As a result, it was verified that a wavelength range where the reflectivity rapidly decreases, that is, a steep transmission wavelength range in the selective reflection wavelength range corresponding to the cholesteric liquid crystal layer was shown. At this time, the peak transmission wavelength in the transmission wavelength range was 633 nm.

(Preparation of Sensor)

A laser light source that emitted light having a center wavelength of 633 nm, a LED light source (where a yellow phosphor is formed on a blue LED), and a light-receiving element were prepared.

The sensor was prepared such that light was emitted from each of the light sources to a white plate as the object and the light reflected from the white plate is incident into the light-receiving element through the band pass filter. Each of the elements was disposed such that reflected light from a laser light source was vertically incident into the light-receiving element and the band pass filter.

Comparative Example 1

A configuration not including the band pass filter in Example 1 was adopted as a sensor according to Comparative Example 1.

(Evaluation of Sensor)

Light was emitted from the laser light source and the LED light source to the white plate, and the light reflected from the white plate was measured with the light-receiving element.

As a result, as compare to the sensor according to Comparative Example 1, in the sensor according to Example 1, noise generated from the LED light source was reduced, and the laser light was able to be detected.

Example 2

In Example 1, by changing the chiral agent Ch-1 of the composition A-1 to a chiral agent Ch-2 and changing the amount of the chiral agent to 7.94 parts by mass, a composition A-3 was prepared. This composition A-3 is a liquid crystal composition forming a cholesteric liquid crystal layer (cholesteric liquid crystalline phase) that has a selective reflection center wavelength of 630 nm and reflects left circularly polarized light.

Using the same method as in Example 1 except that the composition A-1 was changed to the composition A-3, the first cholesteric liquid crystal layer, the discontinuous layer, and the second cholesteric liquid crystal layer were formed to prepare a band pass filter 2.

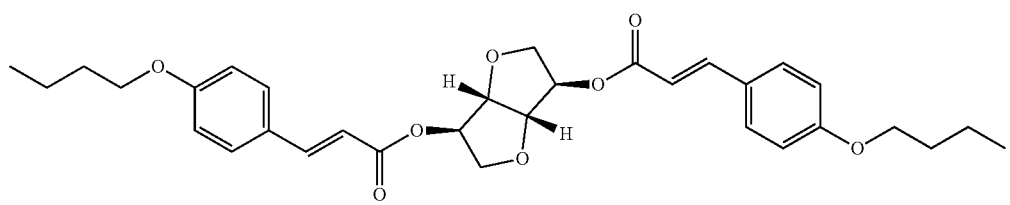

Chiral agent Ch-2

In a case where cross-sections of the first cholesteric liquid crystal layer and the second cholesteric liquid crystal layer were observed with a SEM, the cholesteric liquid crystalline phase had 6 pitches.

The band pass filter 2 prepared as described above was bonded to the band pass filter prepared in Example 1 using an adhesive to prepare a band pass filter according to Example 2 (the first band pass filter and the second band pass filter).

(Evaluation of Band Pass Filter)

Reflection (transmission) characteristics of the band pass filter (cholesteric liquid crystal layer) prepared in Example 2 were measured using a spectrophotometer (UV-3150, manufactured by Shimadzu Corporation). As a result, it was verified that a wavelength range where the reflectivity rapidly decreases, that is, a steep transmission wavelength range in the selective reflection wavelength range corresponding to the cholesteric liquid crystal layer was shown. At this time, the peak transmission wavelength in the transmission wavelength range was 633 nm.

In addition, in the band pass filter prepared in Example 2, as compared to the band pass filter prepared in Example 1, a difference between the maximum reflectivity in the selective reflection wavelength range of the cholesteric liquid crystal layer and the minimum reflectivity in the steep transmission wavelength range of the selective reflection wavelength range was expanded. As a result, it can be seen that, in the band pass filter according to Example 2, the effect of reducing noise light in the selective reflection wavelength range was higher than that of the band pass filter according to Example 1.

Evaluation of Sensor)

A sensor was prepared using the same method as that of Example 1 by disposing the light source, the white plate, the band pass filter, and the light-receiving element, and light reflected from the white plate was measured.

As a result, as compare to the sensor according to Example 1, in the sensor according to Example 2, noise generated from the LED light source was further reduced, and the laser light was able to be more suitably detected.

Example 3

(Lens Element)

As the lens element, both of concave lenses (SLSQ-10B-10NS, manufactured by Sigmakoki Co., Ltd.) were prepared.

(Evaluation of Sensor)

A sensor was prepared using the same method as that of Example 1, except that the lens element was disposed on the front surface of the band pass filter, and light reflected from the white plate was measured. In this case, each of the elements was disposed such that reflected light from a laser light source was vertically incident into the light-receiving element and the band pass filter.

Therefore, the measurement of the reflected light was performed after tilting the optical elements including the lens element, the band pass filter, and the light-receiving element on a basis of +20° and 5° with respect to the reflected light from the laser light source.

The same evaluation was performed for the sensors according to Comparative Example 1 and Example 1.

In the sensor according to Example 3, as compared to the sensor according to Comparative Example 1, in the front and oblique directions, noise generated from the LED light source was reduced, and laser light was able to be detected. In addition, in the sensor according to Example 3, as compared to the sensor according to Example 1, in the oblique direction, the sensitivity of laser light was improved.

Example 4

(Lens Element)

<Exposure of Alignment Film>

Figure 15:
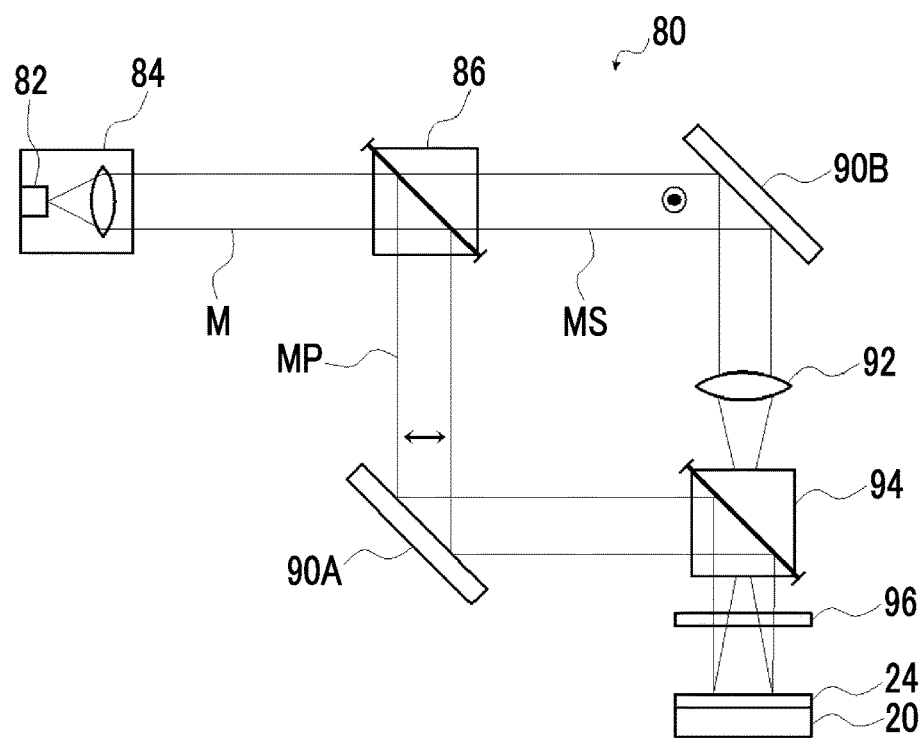
FIG. 15 is a diagram conceptually showing an exposure device of an alignment film.

An alignment film was formed using the same method as that of the alignment film P-1 according to Example 1, and the alignment film 24 was exposed using an exposure device 80 shown in FIG. 15 to form an alignment film P-2 having an alignment pattern.

An exposure device 80 includes: a light source 84 that includes a laser 82; a polarization beam splitter 86 that divides the laser light M emitted from the laser 82 into S polarized light MS and P polarized light MP; a mirror 90A that is disposed on an optical path of the P polarized light MP; a mirror 90B that is disposed on an optical path of the S polarized light MS; a lens 92 that is disposed on the optical path of the S polarized light MS; a polarization beam splitter 94; and a λ/4 plate 96.

The P polarized light MP that is split by the polarization beam splitter 86 is reflected from the mirror 90A to be incident into the polarization beam splitter 94. On the other hand, the S polarized light MS that is split by the polarization beam splitter 86 is reflected from the mirror 90B and is collected by the lens 92 to be incident into the polarization beam splitter 94.

The P polarized light MP and the S polarized light MS are multiplexed by the polarization beam splitter 94, are converted into right circularly polarized light and left circularly polarized light by the λ/4 plate 96 depending on the polarization direction, and are incident into the alignment film 24 on the support 20.

Due to interference between the right circularly polarized light and the left circularly polarized light, the polarization state of light with which the alignment film 24 is irradiated periodically changes according to interference fringes. The intersecting angle between the right circularly polarized light and the left circularly polarized light changes from the inside to the outside of the concentric circle. Therefore, an exposure pattern in which the pitch changes from the inside to the outside can be obtained. As a result, in the alignment film 24, a concentric circular alignment pattern in which the alignment state periodically changes can be obtained.

In the exposure device 80, a laser that emits laser light having a wavelength (325 nm) was used as the laser. The exposure dose of the interference light was 300 mJ/cm$^2$. By using the exposure device shown in FIG. 15, the single period of the alignment pattern gradually decreased toward the outer direction.

<Formation of Optically-Anisotropic Layer (Preparation of Lens Element)>

As the liquid crystal composition forming the lens element, the following composition L-1 was prepared. The composition L-1 is a liquid crystal composition for forming an anisotropic layer.

| Composition L-1 | |
|---|---|
| Rod-shaped liquid crystal compound L-1 | 100.00 parts by mass |
| Polymerization initiator (IRGACURE (registered trade name) 907, manufactured by BASF SE) | 3.00 parts by mass |

| Composition L-1 | |
| --- | --- |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 937.00 parts by mass |

The optically-anisotropic layer was formed by applying multiple layers of the composition L-1 to the alignment film P-2.

The application of the multiple layers refers to repetition of the following processes including: preparing a first liquid crystal immobilized layer by applying the first layer-forming composition L-1 to the alignment film, heating the composition L-1, cooling the composition L-1, and irradiating the composition L-1 with ultraviolet light for curing; and preparing a second or subsequent liquid crystal immobilized layer by applying the second or subsequent layer-forming composition L-1 to the formed liquid crystal immobilized layer, heating the composition L-1, cooling the composition L-1, and irradiating the composition L-1 with ultraviolet light for curing as described above. Even in a case where the liquid crystal layer was formed by the application of the multiple layers such that the total thickness of the optically-anisotropic layer was large, the alignment direction of the alignment film was reflected from a lower surface of the optically-anisotropic layer to an upper surface thereof.

Regarding the first liquid crystal layer, the following composition L-1 was applied to the alignment film P-2 to form a coating film, the coating film was heated using a hot plate at 80° C., and the coating film was irradiated with ultraviolet light having a wavelength of 365 nm at an irradiation dose of 300 mJ/cm$^2$ using a high-pressure mercury lamp in a nitrogen atmosphere at 80° C. As a result, the alignment of the liquid crystal compound was immobilized.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, an optically-anisotropic layer was obtained, and a lens element was prepared.

A complex refractive index Δn of the cured layer of a liquid crystal composition L-1 was obtained by applying the liquid crystal composition L-1 to a support with an alignment film for retardation measurement that was prepared separately, aligning the director of the liquid crystal compound to be parallel to the substrate, irradiating the liquid crystal compound with ultraviolet irradiation for immobilization to obtain a liquid crystal immobilized layer (cured layer), and measuring the retardation value and the thickness of the liquid crystal immobilized layer. An can be calculated by dividing the retardation value by the thickness. The retardation value was measured by measuring a desired wavelength using Axoscan (manufactured by Axometrix inc.) and measuring the thickness using a SEM.

Finally, in the optically-anisotropic layer, $\Delta n_{630} \times$thickness (Re(630)) of the liquid crystals was 315 nm, and it was verified using a polarization microscope that concentric circular (radial) periodic alignment occurred on the surface as shown in FIG. 12. In the liquid crystal alignment pattern of the first optically-anisotropic layer, regarding the single period over which the optical axis of the liquid crystal compound rotated by 180°, and the single period of a portion at a distance of 5 mm from the center was 1.4 μm. This way, the single period decreased toward the outer direction.

(Evaluation of Sensor)

A sensor was prepared using the same method as that of Example 3, except that the lens element according to Example 3 was changed to the lens element including the optically-anisotropic layer prepared as described above, and the same evaluation was performed.

In the sensor according to Example 4, as compared to the sensor according to Comparative Example 1, in the front and oblique directions, noise generated from the LED light source was reduced, and laser light was able to be detected. In addition, in the sensor according to Example 4, as compared to the sensor according to Example 1, in the oblique direction, the sensitivity of laser light was improved.

Example 5

(Evaluation of Sensor) A sensor was prepared using the same method as that of Example 3, except that the configuration of Example 3 including one band pass filter was changed to the configuration including two band pass filters (the first band pass filter and the second band pass filter) prepared in Example 2, and the same evaluation was performed.

In the sensor according to Example 5, as compare to the sensor according to Example 3, noise generated from the LED light source was reduced, and the laser light was able to be detected.

Example 6

(Evaluation of Sensor) A sensor was prepared using the same method as that of Example 4, except that the configuration of Example 4 including one band pass filter was changed to the configuration including two band pass filters (the first band pass filter and the second band pass filter) prepared in Example 2, and the same evaluation was performed.

In the sensor according to Example 6, as compare to the sensor according to Example 4, noise generated from the LED light source was reduced, and the laser light was able to be detected.

As can be seen from the above results, the effects of the present invention are obvious.

The present invention is suitably applicable to various sensors that performs optical measurement, for example, a distance-measuring sensor.

EXPLANATION OF REFERENCES

10: sensor
12: light source
14: light-receiving element
16, 60: band pass filter
20, 46: support
24, 48: alignment film
26: first cholesteric liquid crystal layer
28: second cholesteric liquid crystal layer
30: discontinuous layer
32, 52: liquid crystal compound
40: concave lens
42: liquid crystal diffraction element
50: optically-anisotropic layer
52A: optical axis
80: exposure device 82: laser
84: light source
86, 94: polarization beam splitter
90A, 90B: mirror
96: λ/4 plate
92: lens
E1, E2: equiphase surface
Q1, Q2: absolute phase
$L_1$, $L_4$: incidence light
$L_2$, $L_5$: transmitted light
M: laser light
MA, MB: beam
MP: P polarized light
MS: S polarized light

What is claimed is:

1. A sensor comprising:
a light source;
a band pass filter; and
a light-receiving element,
wherein the band pass filter includes a first cholesteric liquid crystal layer and a second cholesteric liquid crystal layer that are layers obtained by immobilizing a cholesteric liquid crystalline phase and a discontinuous layer that is disposed between the first cholesteric liquid crystal layer and the second cholesteric liquid crystal layer,
in the first cholesteric liquid crystal layer and the second cholesteric liquid crystal layer, helical twisted directions and helical pitches of the cholesteric liquid crystalline phases are the same,
wherein the discontinuous layer is a layer other than a cholesteric liquid crystal layer and a wavelength having a lowest reflectivity in a selective reflection wavelength range of the band pass filter is represented by λm [nm], a thickness [nm] is in a range of 30×(λm/550) to 150×(λm/550)

the discontinuous layer is an optically-anisotropic layer, and
the optically-anisotropic layer is a liquid crystal layer.

2. The sensor according to claim 1, further comprising:
a lens element that is provided between the light source and the band pass filter.

3. The sensor according to claim 2,
wherein the lens element is a diffraction element.

4. The sensor according to claim 3,
wherein the diffraction element is a liquid crystal diffraction element including an optically-anisotropic layer that is formed of a liquid crystal composition including a liquid crystal compound,
the optically-anisotropic layer has a liquid crystal alignment pattern in which a direction of an optical axis derived from the liquid crystal compound changes while continuously rotating in at least one in-plane direction, and
wherein a length over which the direction of the optical axis derived from the liquid crystal compound rotates by 180° in a plane is set as a single period, the length of the single period in the liquid crystal alignment pattern gradually decreases in the one in-plane direction.

5. The sensor according to claim 4,
wherein the liquid crystal alignment pattern of the optically-anisotropic layer in the liquid crystal diffraction element is a concentric circular pattern having a concentric circular shape where the one in-plane direction in which the direction of the optical axis derived from the liquid crystal compound changes while continuously rotating moves from an inside toward an outside.

6. The sensor according to claim 1, further comprising:
a light shielding member that shields light in a wavelength range that overlaps at least a part of a selective reflection wavelength range of the band pass filter, the wavelength range being at least one of a longer wavelength range or a shorter wavelength range than a wavelength having a lowest reflectivity in the selective reflection wavelength range of the band pass filter.

7. The sensor according to claim 6,
wherein the light shielding member shields both of the longer wavelength range and the shorter wavelength range than the wavelength having the lowest reflectivity in the selective reflection wavelength range of the band pass filter.

8. The sensor according to claim 1,
wherein a first band pass filter and a second band pass filter are provided as the band pass filter, and
in the first cholesteric liquid crystal layer and the second cholesteric liquid crystal layer of the first band pass filter and the first cholesteric liquid crystal layer and the second cholesteric liquid crystal layer of the second band pass filter, helical twisted directions are different from each other and helical pitches are the same.

* * * * *